United States Patent [19]
Okimoto et al.

[11] Patent Number: 5,623,301
[45] Date of Patent: Apr. 22, 1997

[54] DIGITAL COPIER WITH MEMORY OCCUPANCY CALCULATION

[75] Inventors: Morihiko Okimoto, Yokohama; Masahito Obata, Tokyo; Hidefumi Nishitsuji; Takanobu Saito, both of Yokohama, all of Japan

[73] Assignee: Ricoh Company, Ltd., Tokyo, Japan

[21] Appl. No.: 272,585

[22] Filed: Jul. 11, 1994

[30] Foreign Application Priority Data

Jul. 12, 1993 [JP] Japan .................................. 5-171535

[51] Int. Cl.⁶ ........................................................ B41J 2/39
[52] U.S. Cl. ........................................................ 347/251
[58] Field of Search .................................. 347/251, 247, 347/240, 131

[56] References Cited

U.S. PATENT DOCUMENTS 4,885,576  12/1989  Pennebaker et al. ............... 358/261.1
5,198,853  3/1993  Ichihara et al. ...................... 358/449
5,223,948  6/1993  Sakurai et al. ....................... 358/404

*Primary Examiner*—Mark J. Reinhart
*Attorney, Agent, or Firm*—Lowe, Price, LeBlanc & Becker

[57] ABSTRACT

In a digital copier of the type writing image data read by a scanner in a memory and transferring them from the memory to a printer, a memory change flag indicative of whether or not to calculate the occupancy of the memory is checked. If the flag is set, the occupancy of the memory is calculated and sent to a system controller. One or more reference amounts, which are easy for the user to grasp (e.g. amount corresponding to a single paper of A4 size), can be entered on an operation and display panel. The occupancy of the memory is displayed on the operation and display panel on the basis of each of the reference amounts. The memory change flag is set when image data have been fully written to the memory and when the discharge of a recording medium carrying an image thereon from the copier has been detected (end of read-out). The copier prevents the image data stored in the memory from being destroyed.

13 Claims, 21 Drawing Sheets

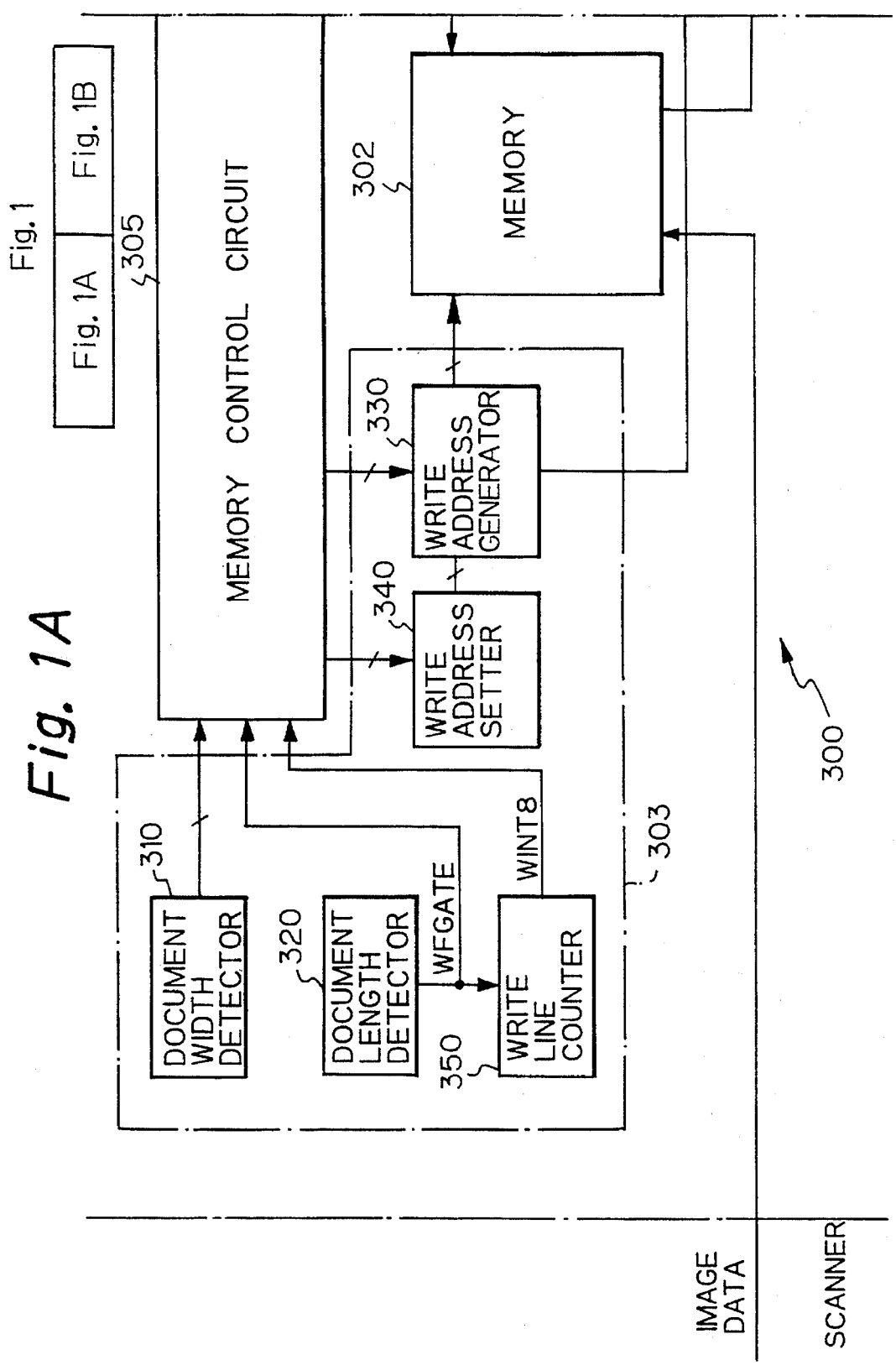

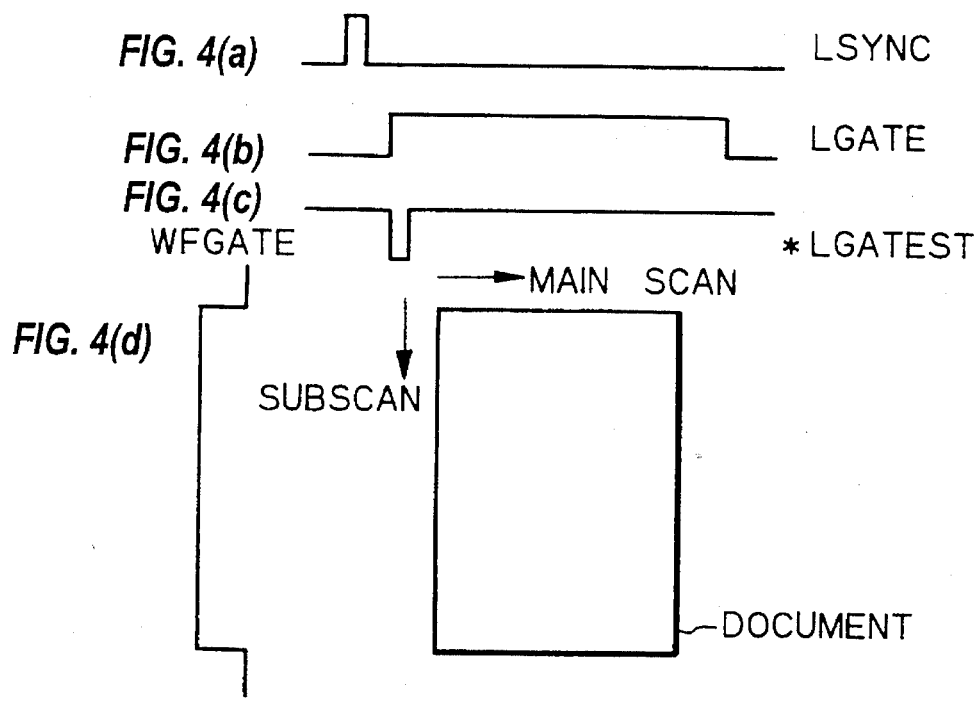
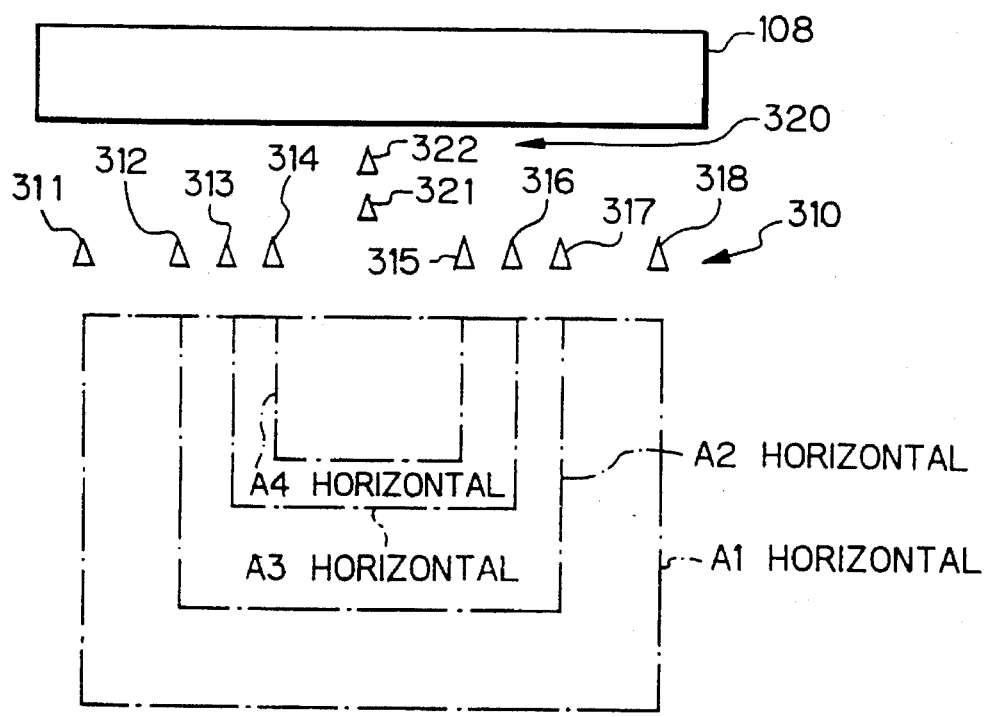

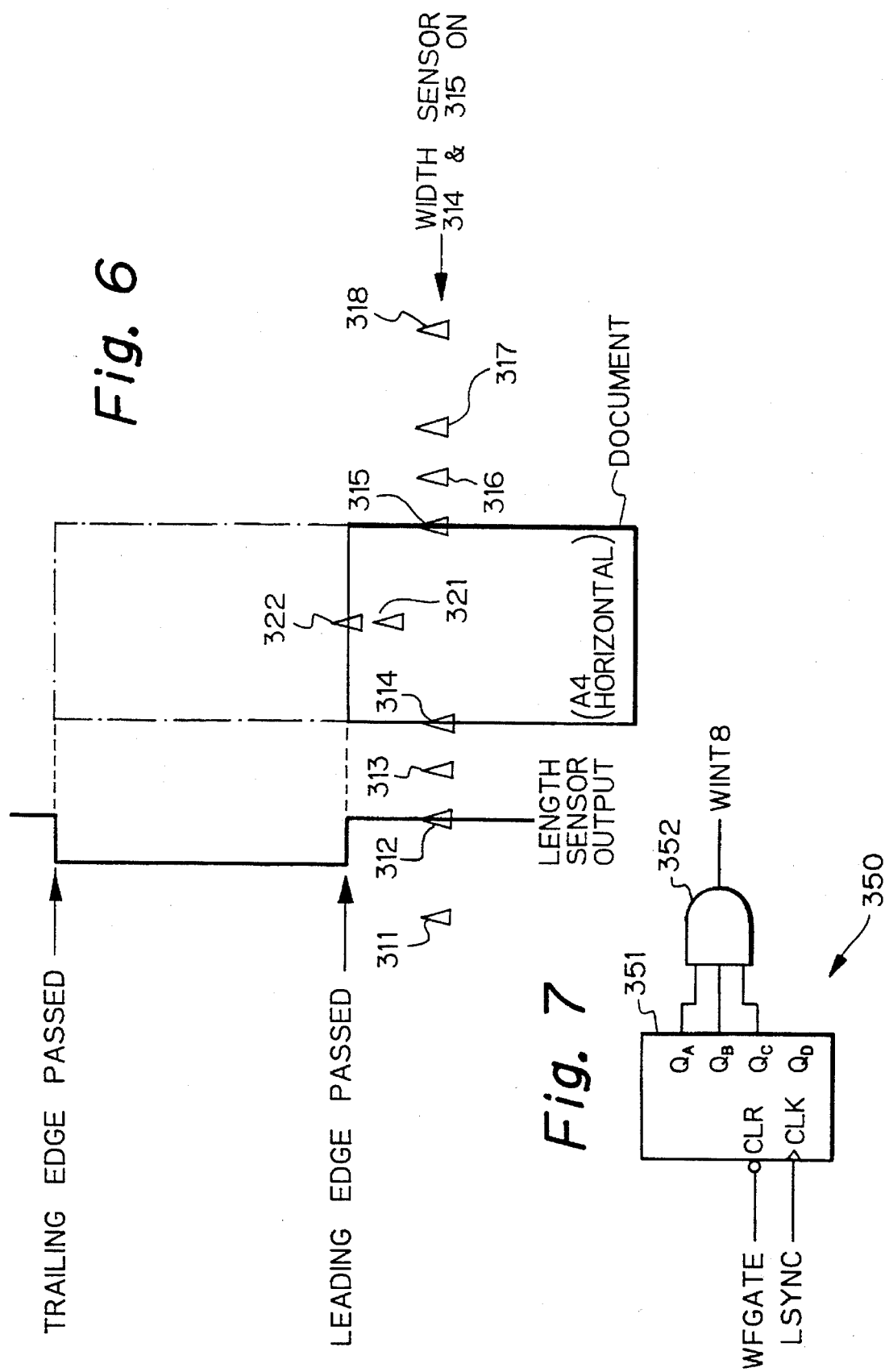

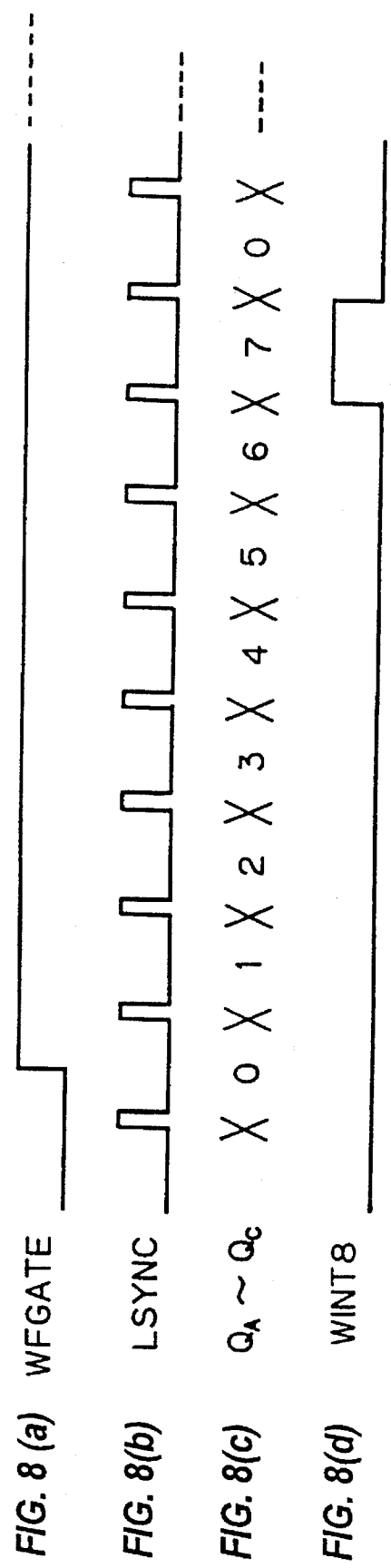

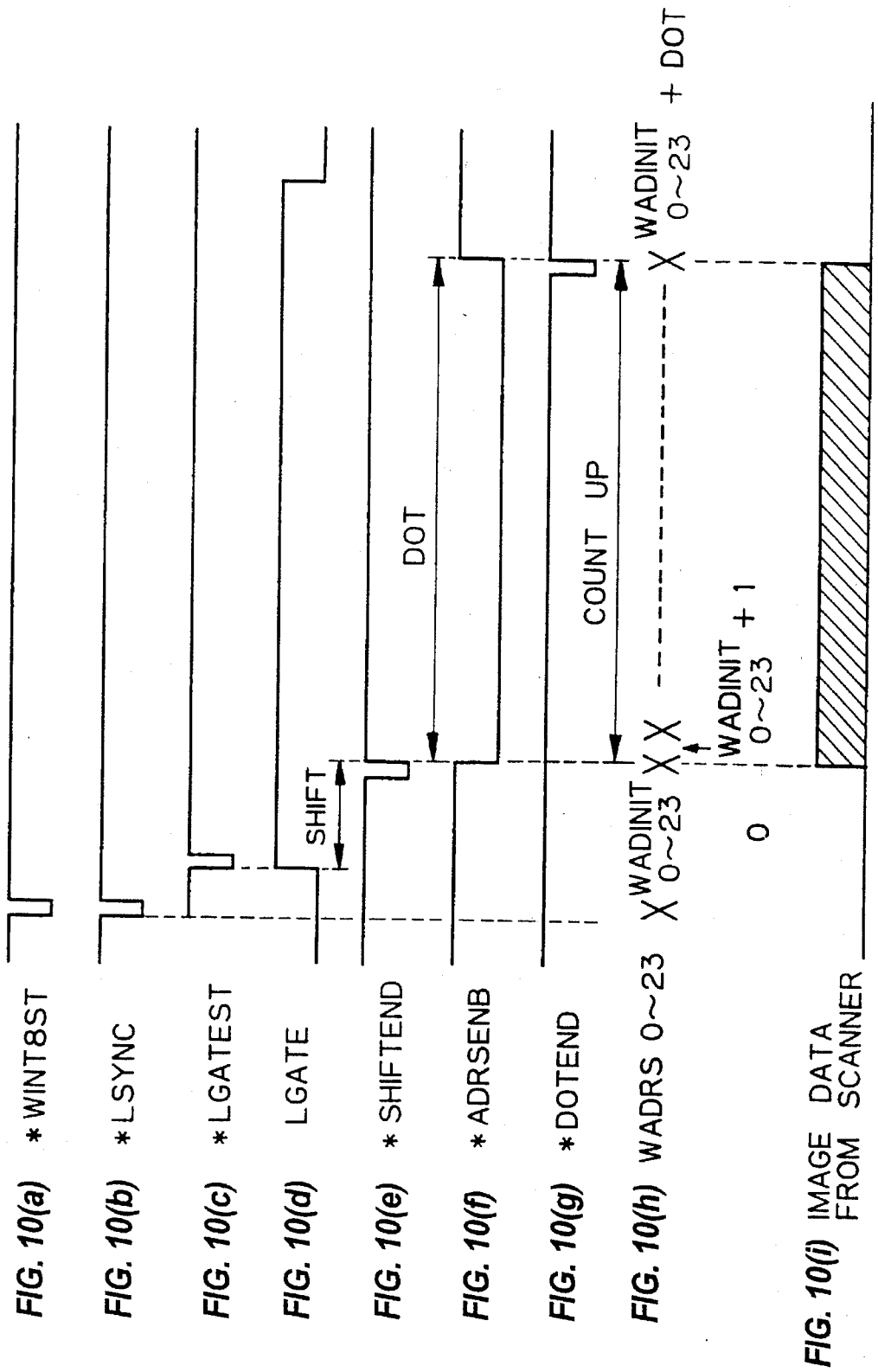

Fig. 13
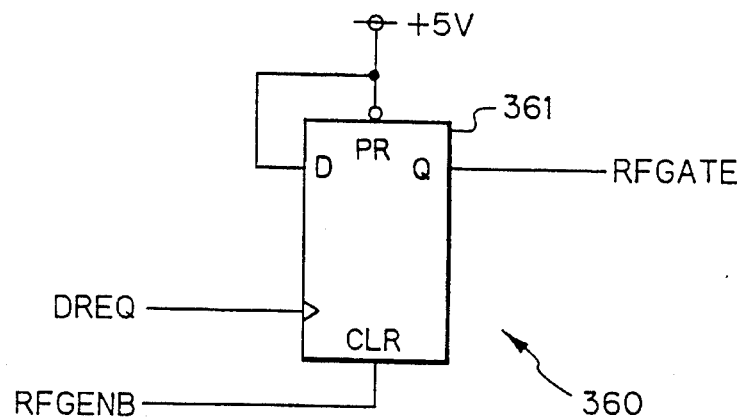
FIG. 14(a) RFGENB 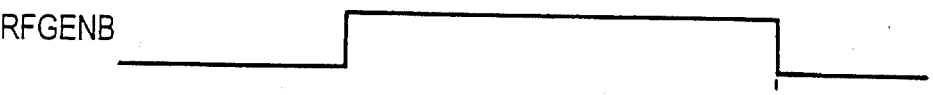
FIG. 14(b) DREQ 
FIG. 14(c) RFGATE 
Fig. 15
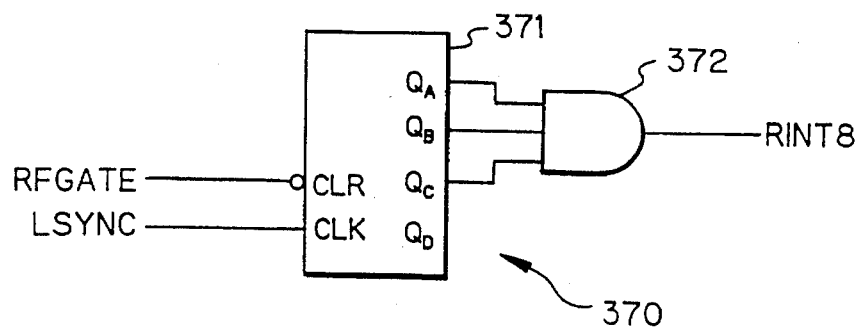

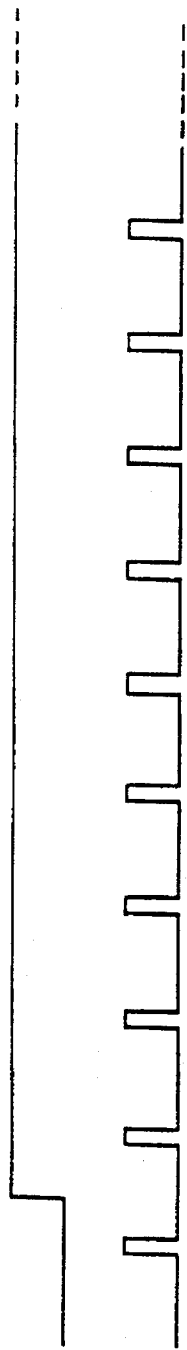
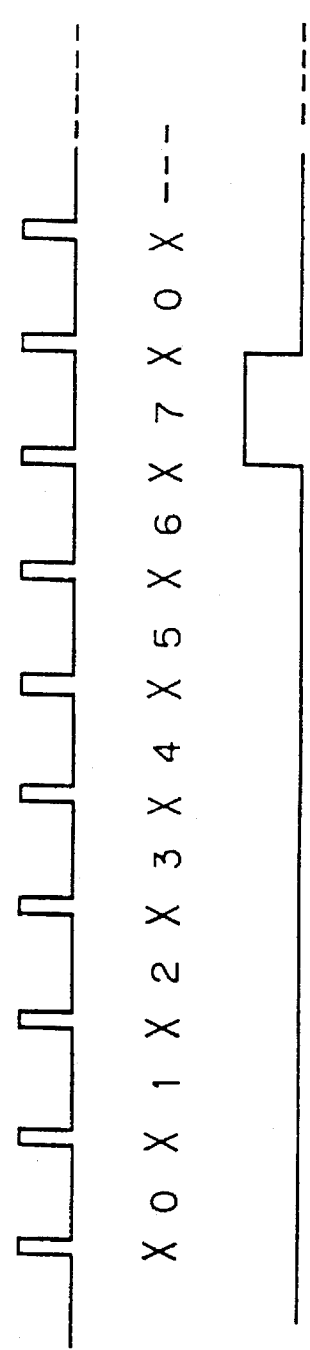
FIG. 16(a) RFGATE
FIG. 16(b) LSYNC
FIG. 16(c) $Q_A \sim Q_C$
FIG. 16(d) RINT8

Fig. 17
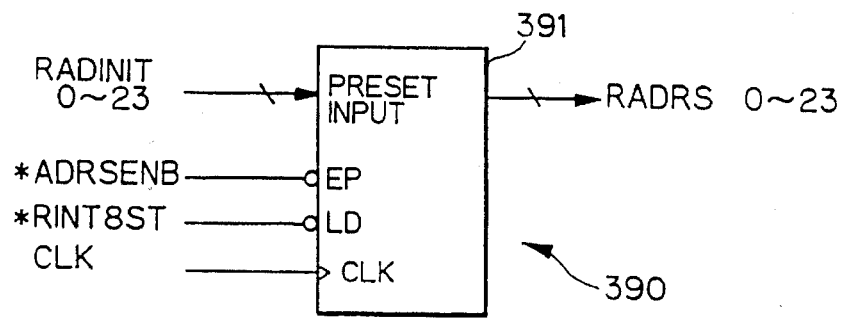
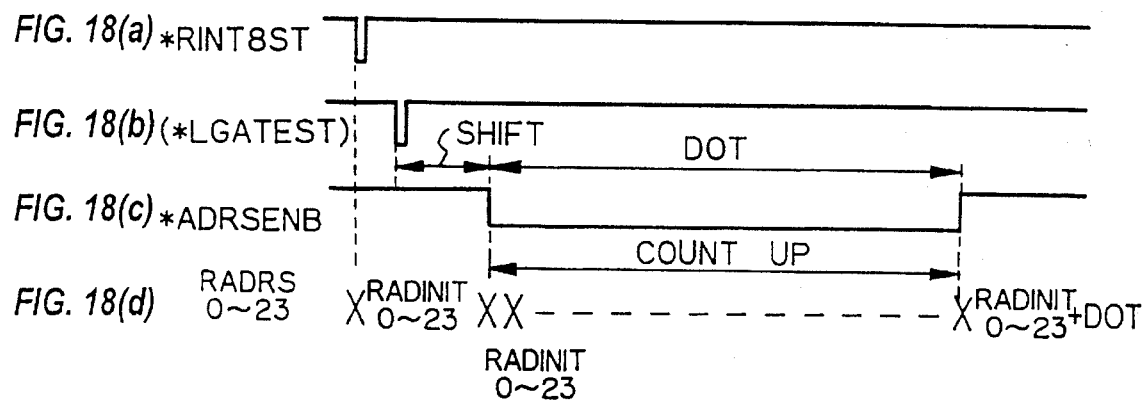
Fig. 19
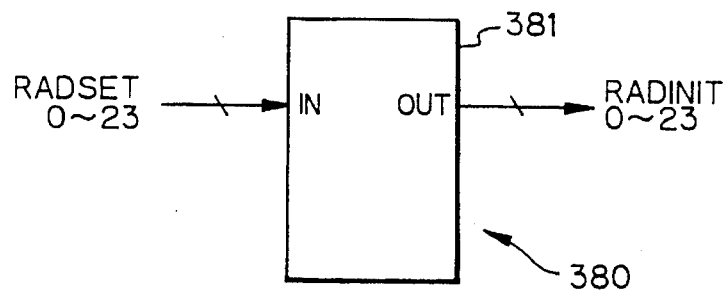

DIGITAL COPIER WITH MEMORY OCCUPANCY CALCULATION

BACKGROUND OF THE INVENTION

The present invention relates to a digital copier of the type writing image data read by a scanner in a memory and transferring them from the memory to a printer.

It is a common practice with a digital copier of the type described to write image data representative of a single document and read by a scanner in a memory capable of accommodating one or more pages. The image data are transferred from the memory to a printer to be printed out. This type of copier can form a plurality of images repeatedly only if a document is read once and, therefore, has inherently high copying speed. In addition, when a plurality of documents should be reproduced, it is possible to cause, before the reproduction of the preceding document ends, the copier to sequentially read the following documents, store the resulting image data in the memory, and waits until the reproduction of the preceding document ends.

However, the problem with the conventional digital copier described above is that the capacity of the memory and, therefore, the number of documents which can be sequentially read is limited. Moreover, the document size sometimes exceeds the capacity of the memory. Hence, when the amount of image data exceeds the upper limit of the memory capacity, image data are inhibited from being written to the memory, or image data stored in the memory are destroyed. When image data in the memory are destroyed, the operator has to cause the scanner to read the documents all over again or otherwise deal with such an occurrence.

SUMMARY OF THE INVENTION

It is, therefore, an object of the present invention to provide a digital copier of the type described which is capable of calculating the occupancy of a memory so as to prevent image data stored in the memory from being destroyed.

A digital copier of the present invention comprises a reading device for reading an image of a document digitally, a storage for storing image data read by the reading device, a write control circuit for writing the image data read by the reading device in the storage, a read control circuit for reading the image data out of the storage, and an image forming device for forming a document image on a recording medium on the basis of the image data read out of the storage by the read control circuit. The write control circuit has a document length detector for detecting the length, in the subscanning direction, of the document read by the reading device, a line counter for counting the write lines of the storage over the length of the document detected by the document length detector, an address setter for setting the write address for the storage on the basis of a count output from the line counter, and a calculating circuit for calculating the occupancy of the storage on the basis of the write address set by the address setter.

BRIEF DESCRIPTION OF THE DRAWINGS

The above and other objects, features and advantages of the present invention will become more apparent from the following detailed description taken with the accompanying drawings in which:

FIGS. 1(A) and 1(B) are block diagrams schematically showing a memory which constitutes essential part of a digital copier embodying the present invention;

FIGS. 4(a)–(d) show a relation between control signals and a document;

FIG. 5 shows a sensor arrangement implementing a document width detector and a document length detector included in the embodiment;

FIG. 6 demonstrates the operation of the sensors shown in FIG. 5;

FIG. 7 is a block diagram schematically showing a write line counter included in the embodiment;

FIGS. 8(a)–(d) are timing charts representative of the operation of the write line counter;

FIGS. 10(a)–10(i) are timing charts representative of the operation of the write address generator;

FIG. 13 is a block diagram schematically showing a read valid signal generator included in the embodiment;

FIGS. 14(a)–(c) are timing charts demonstrating the operation of the read valid signal generator;

FIG. 15 is a block diagram schematically showing a read line counter included in the embodiment;

FIGS. 16(a)–16(d) are timing charts representative of the operation of the read line counter of FIG. 15;

FIG. 17 is a block diagram schematically showing a read address generator included in the embodiment;

FIGS. 18(a)–18(d) are timing charts representative of the operation of the read address generator of FIG. 17;

FIG. 19 is a block diagram schematically showing a read address setter included in the embodiment;

DESCRIPTION OF THE PREFERRED EMBODIMENT

Figure 1B:
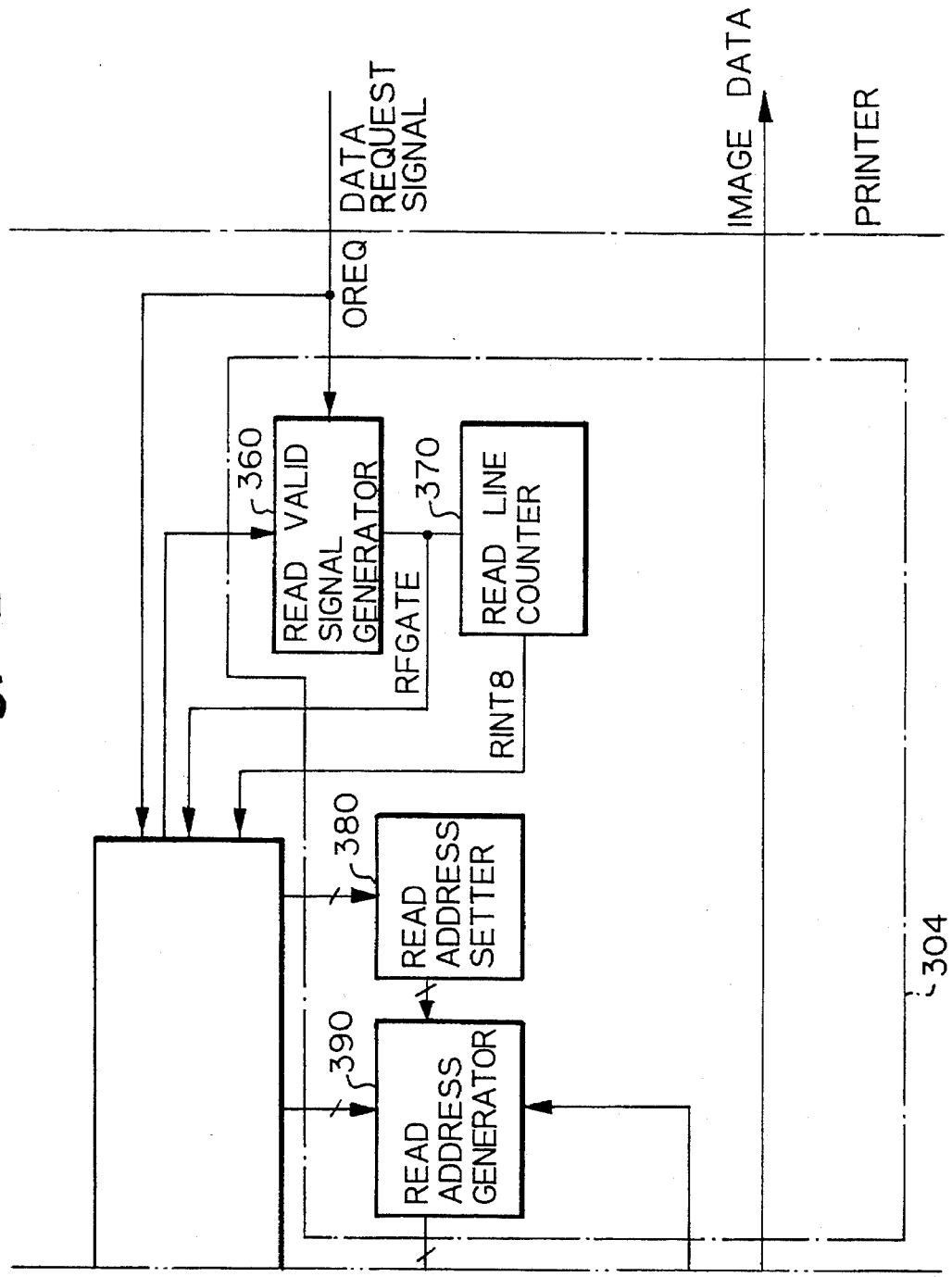
Figure 2:
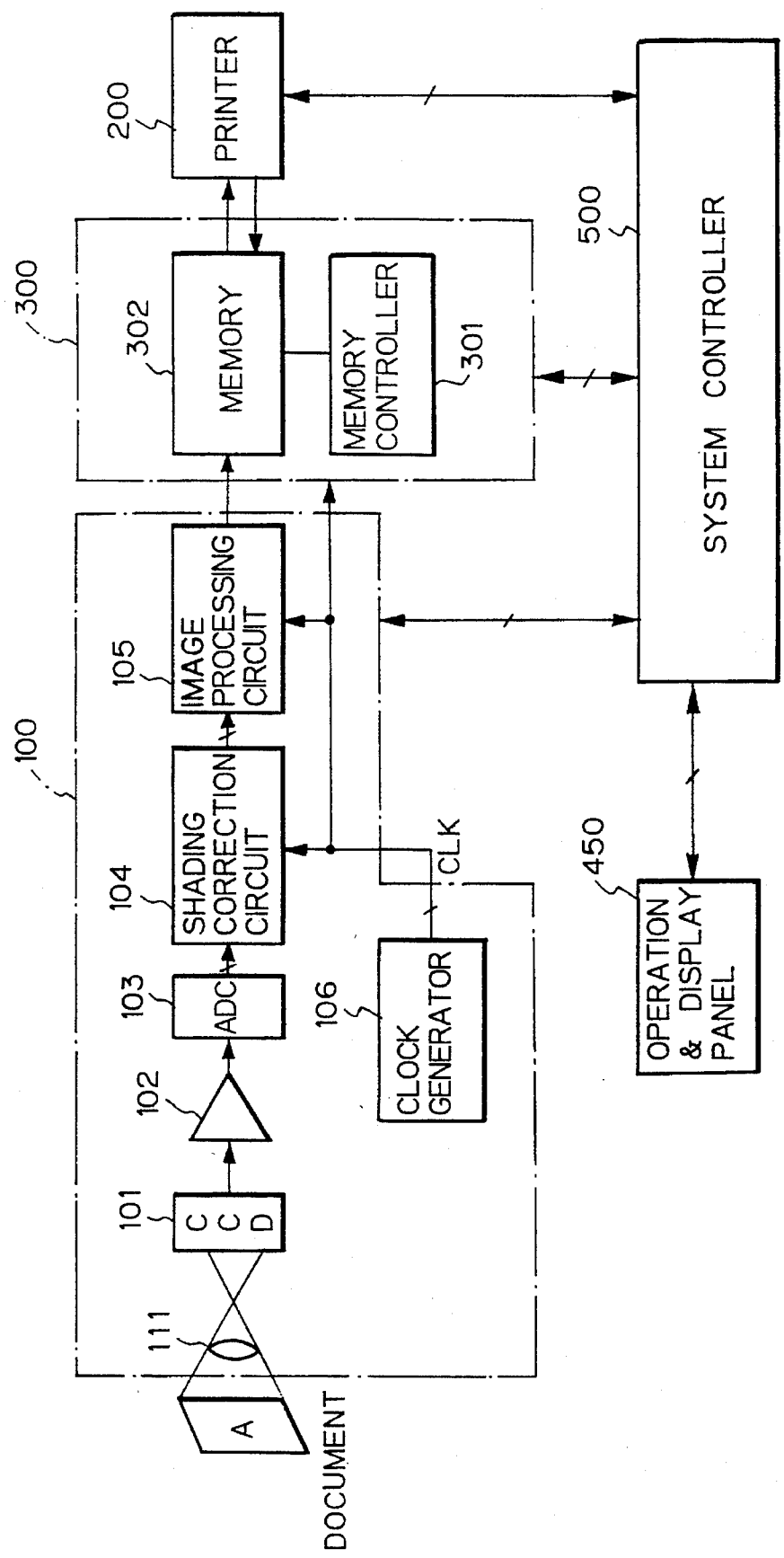
FIG. 2 is a block diagram schematically showing the digital copier including the memory of FIG. 1.

Referring to FIG. 2 of the drawings, a digital copier embodying the present invention is shown. As shown, the copier is generally made up of a scanner 100, a memory section 300, a printer 200, an operation and display panel 450, and a system controller 500. The scanner 100 reads image data out of a document. The memory section, shown in FIG. 1 in detail, stores the image data read by the scanner 100. The printer 200 prints out the image data read out of the memory 300 on a paper or similar recording medium. The operation and display panel 450 is accessible for setting up various kinds of copy modes; various kinds of information appear on the panel 450. The system controller 500 controls the entire copier, particularly the reading of image data out of a document and the writing of the same.

Figure 3:
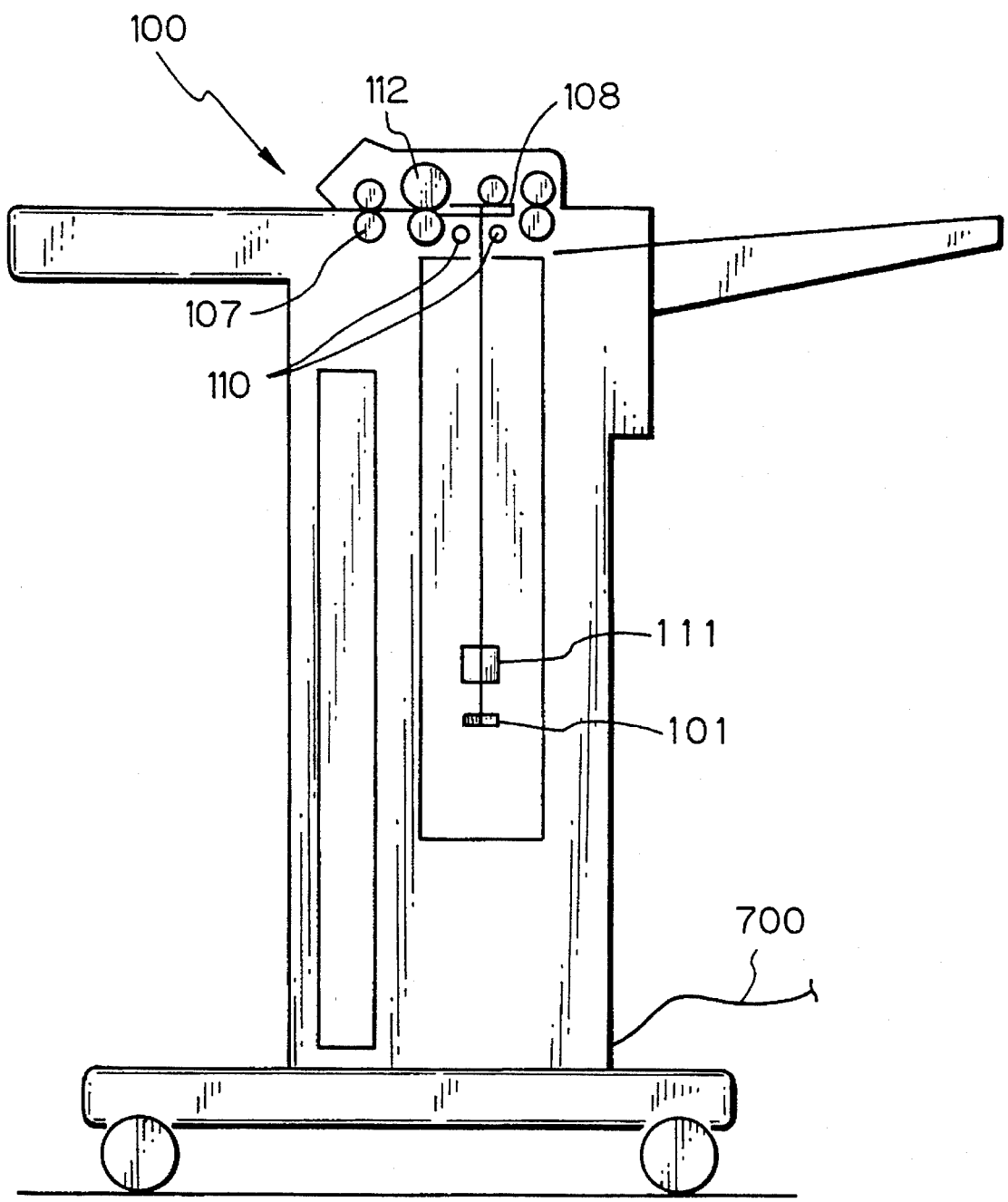
FIG. 3 is a side elevation of a scanner included in the embodiment.

As shown in FIG. 3 specifically, the scanner 100 has a light source 110. A document is conveyed along a glass platen 1 by an inlet roller pair 107 and a conveyor roller pair 112 with the center thereof as a reference. As the light source 110 illuminates the document being conveyed, the resulting reflection from the document is focused onto a CCD (Charge Coupled Device) image sensor 101 by a lens 111. The CCD image sensor 101 transforms the incident light to an analog image signal. As shown in FIG. 2, the analog image signal is amplified by an amplifier 102, converted to digital image data by an analog-to-digital converter (ADC) 103, and then applied to a shading correction circuit 104. The shading correction circuit 104 corrects the image data to compensate for irregularities in the sensitivity of the image sensor 101, irregularities in the quantity of light from the light source 110, and errors in the light quantity distribution of the lens 111. Subsequently, an image processing circuit 105 executes MTF (Modulation Transfer Function) correction, magnification change, binarization and other various kinds of image processing with the image data undergone shading correction. The image data from the image processing circuit 105 is transferred to the memory section 300 over a coaxial cable 700, FIG. 3.

FIG. 4 shows a relation between control signals and a document. As shown, control signals include a signal LSYNC for synchronization in the main scanning direction, a signal LGATE indicative of the maximum valid reading range in the main scanning direction, a signal *LGATEST ("*" means "inverted" and will be used with terminals also), a signal WFGATE indicative of the maximum valid reading range in the subscanning direction, as will be described in detail later, and a clock signal CLK, FIG. 2. The clock signal CLK is generated by a clock generator 106. FIG. 2, and serves as a reference for the entire copier.

As shown in FIG. 2, the memory section 300 has a memory controller 301 and a memory 302. The memory 302 is implemented by sixty-four DRAMs (Dynamic Random Access Memories) each having a capacity of 4 megabits. Such a capacity of the memory 302 corresponds to a single A0 size when a document is read in a density of 400 dots per inch (dpi) in two levels. The printer 200, FIG. 2, is basically identical with an electrophotographic mechanism (including a photoconductive drum, paper transport, image transfer, paper separation, fixation, etc.) built in an analog copier. However, the printer 200 has a writing section particular to a digital copier and, in the embodiment, electrostatically forms a latent image on a photoconductive drum with a laser diode or an LED (Light Emitting Diode) array.

Referring to FIG. 1, the memory section 300, which is the essential part of the embodiment, will be described specifically. The memory 302 stores image data while the memory controller 301 controls the memory 302 as to a write address, read address, etc. The memory controller 301 is made up of a write control circuit 303 for controlling the write address of the memory 302, a read control circuit 304 for controlling the read address of the memory 302, and a memory control circuit 305 for controlling the calculation of write and read addresses, supervision, etc. The write control circuit 303, read control circuit 304, and memory control circuit 305 will be described in detail with reference to FIGS. 5–12, FIGS. 13–19, and FIGS. 20–29, respectively.

Figure 9:
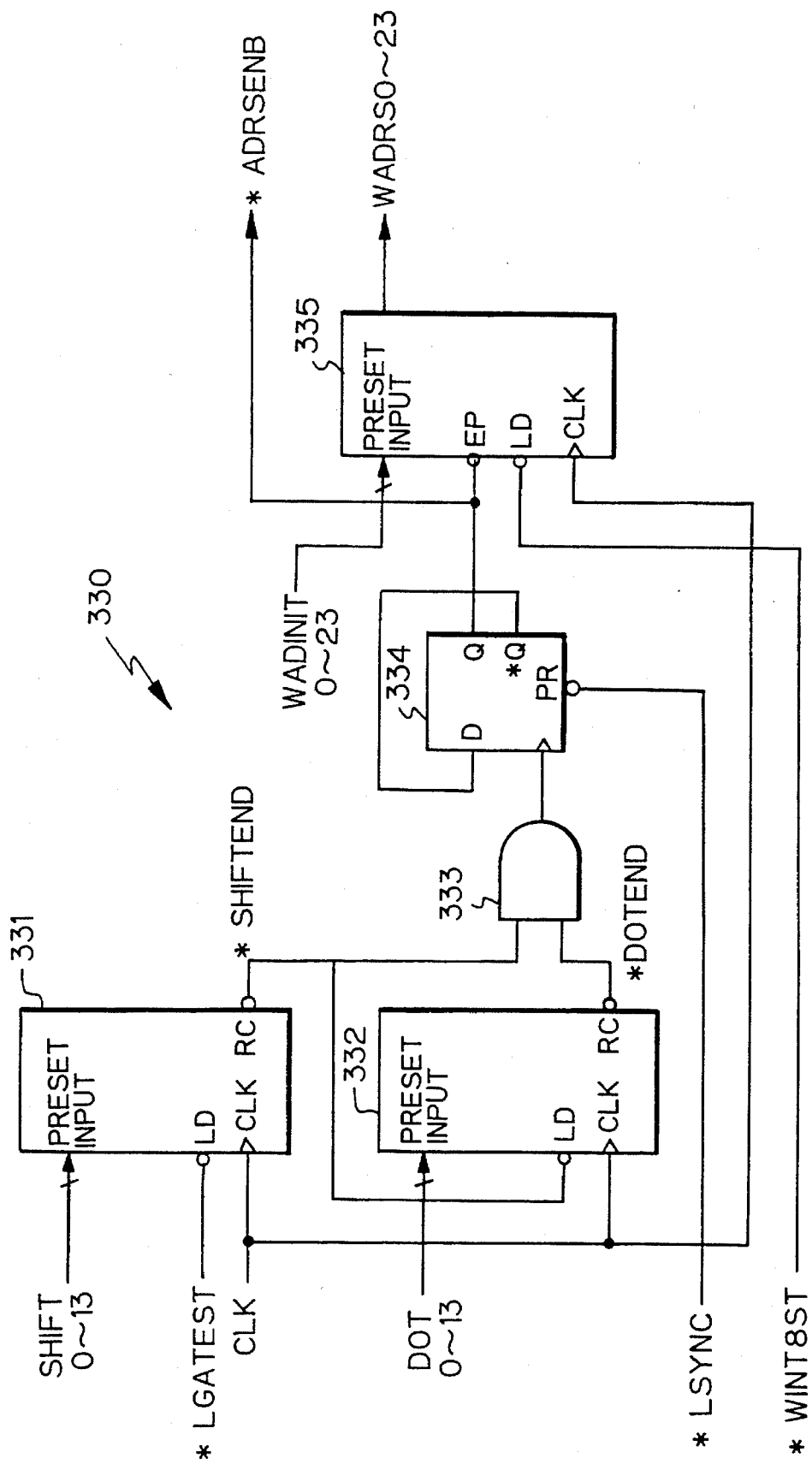
FIG. 9 is a block diagram schematically showing a write address generator included in the embodiment.
Figure 11A:
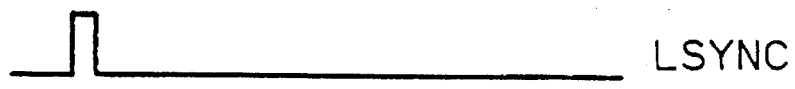
FIGS. 11(a)–11(c) are views indicative of values initially set in the write address generator of FIG. 9.
Figure 11B:
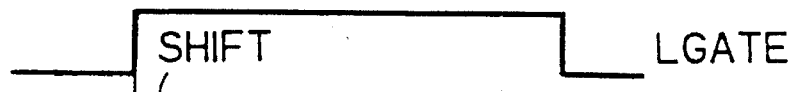
Figure 11C:
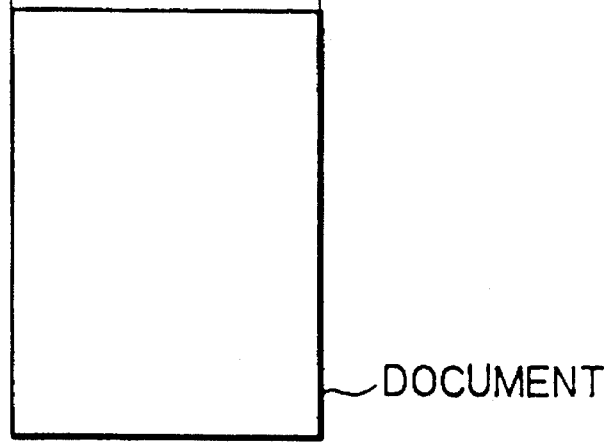
Figure 12:
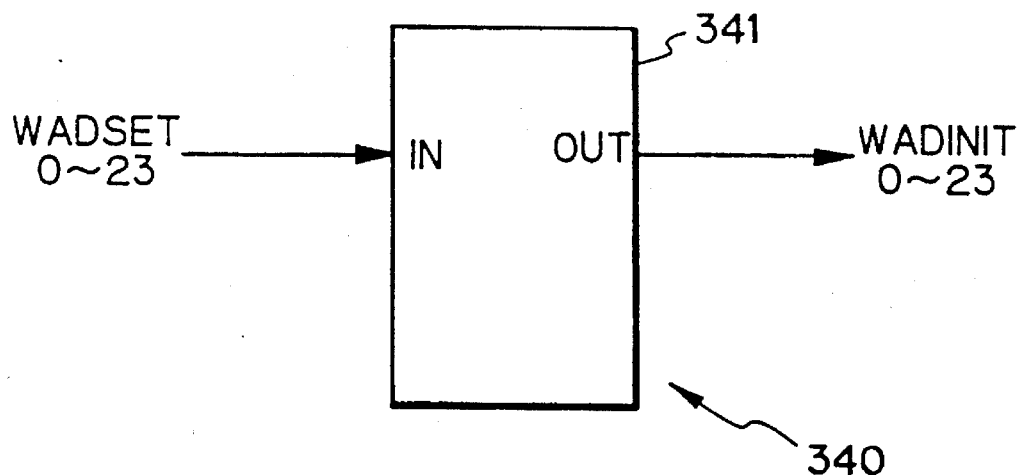
FIG. 12 is a block diagram schematically showing a write address setter included in the embodiment.
Figure 20:
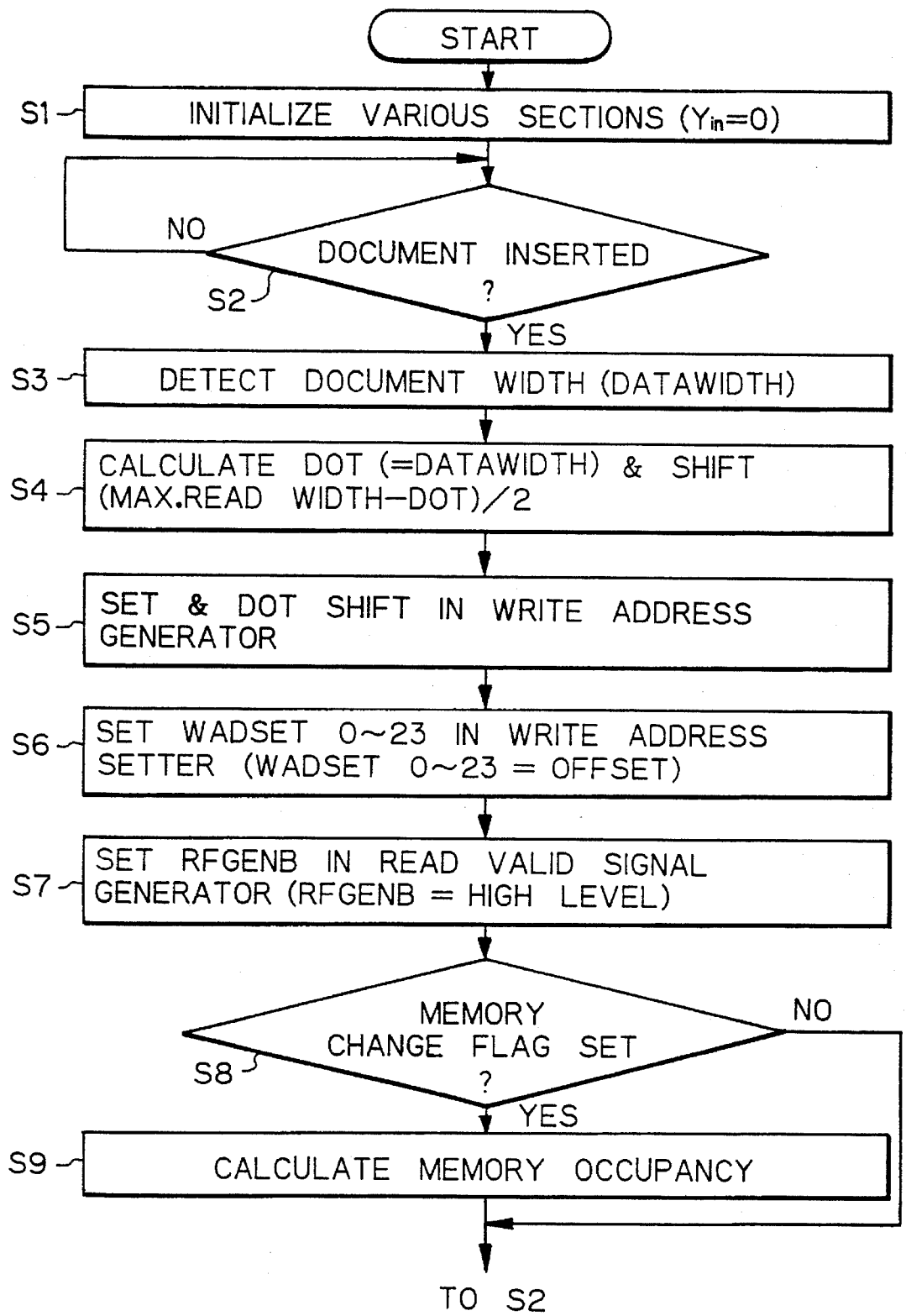
FIG. 20 is a flowchart demonstrating the essential operation of a memory control circuit included in the embodiment.

The write control circuit 303 has a document width detector 310 responsive to the width of a document, i.e., the valid range of image data in the main scanning direction, and a document length detector 320 responsive to the length of a document, i.e., the valid range of image data in the subscanning direction, as shown in FIGS. 5, 6 and 11. The write control circuit 303 also has a write address generator 330 for generating a write address meant for the memory 302, as shown in FIGS. 9 and 10. Further, the write control circuit 303 has a write address setter 340 for setting the initial value for the write address generator 330, as shown in FIG. 12. In addition, the write control circuit 303 has a line counter 350 for counting read lines of a document, i.e., the write lines of the memory 302 while the signal indicative of the valid range of image data in the subscanning direction, detected by the document length detector 320, is valid.

In the read control circuit 304, a read valid signal generator 360 generates a read valid signal RFGATE in response to a data request signal DREQ from the printer 200, as shown in FIG. 13 and 14. A line counter 370 counts the read lines (LSYNC) of the memory 302 while the read valid signal RFGATE is valid, as shown in FIGS. 15 and 16. A read address generator 390 generates read addresses RADRS meant for the memory 302, as shown in FIGS. 17 and 18. A read address setter 380 sets the initial value of read address RADINIT for the read address generator 390, as shown in FIG. 19.

The detectors 310 and 320 included in the write control circuit 303 and responsive to the width and the length of a document, respectively, will be described specifically. As shown in FIG. 5, when a document transport section included in the scanner 100 is seen from above, width sensors 311–318 are located in front of the glass platen 108 in such a manner as to sense documents of A4, A3, A2 and A1 sizes positioned horizontally long. The sensors 311–318 are implemented by reflection type sensors by way of example. When the operator inserts a document into the inlet roller pair 107, FIG. 3, the sensors 311–318 are selectively turned on, depending on whether or not the document is present thereover. For example, when a document of A4 size is inserted in the horizontally long position, only the central sensors 314 and 315 are turned on, as shown in FIG. 6. When the horizontally long document is of A2 size, the sensors 312–317 are turned on. In this way, the width of the document can be determined on the basis of the combination of the sensors 311–318 turned on. On receiving the resulting width signal DATAWIDTH, the memory control circuit 305 determines the width of the document and feeds a decision signal to the write address generator 330. After the document width has been determined, a pinch solenoid, not shown, associated with the driven roller of the inlet roller pair 107, FIG. 3, is energized to cancel the pressure acting on the driven roller. As a result, the document can be inserted deeper into the scanner.

At the same time, the light source (fluorescent lamp) 110 is turned on to prepare the scanner 100 for a reading operation. As soon as the leading edge of the document abuts against a gate, not shown, a document sensor 321 past the sensors 311–318 is turned on, as shown in FIG. 5. As a result, a motor, not shown, associated with the conveyor roller pair 112, FIG. 3, is driven while, at the same time, a gate solenoid, not shown, is driven to open the gate. In this condition, the document is moved along the glass platen 108 by the conveyor roller pair 112. As shown in FIGS. 5 and 6, as soon as the leading edge of the document moves over a length sensor 322, past the document sensor 321, the sensor 322 is turned on. When the trailing edge of the document moves away from the length sensor 322, the sensor 322 is turned off. Hence, while the document moves over the length sensor 322, a signal WFGATE indicative of a read valid range in the subscanning direction, as shown in FIG. 4, is fed to the memory control circuit 305 and write line counter 350, FIG. 1. As shown in FIG. 7, the write line counter 350 is comprised of a counter 351 and an AND gate 352. The counter 351 receives the read valid range signal WFGATE at a clear terminal CLR and receives the previously mentioned LSYNC at a clock terminal CLK. The output $Q_A$–$Q_C$ of the counter 351 is fed to the AND gate 352.

A reference will be made to FIG. 8 for describing the operation of the write line counter 350. As shown, when the leading edge of the document moves over the length sensor 322, the signal WFGATE goes high. As a result, the counter 351 has the output $Q_A$–$Q_C$ thereof, which has been cleared (zero), set. Every time one line of the document is scanned, i.e., every time the positive-going edge of the signal LSYNC arrives at the clock terminal CLK, the counter 315 is incremented. When the counter 315 reaches a count "7" ($Q_A$–$Q_C$ in a high level), the output WINT8 of the AND gate 352 goes high. Subsequently, the count of the counter 351 returns to "0". Consequently, every time the valid range signal WFGATE in the subscanning direction goes high and eight lines of the document are scanned, the output WINT8 of the AND gate 35 goes high and remains in a high level over the period of the signal LSYNC for synchronization in the main scanning direction. As shown in FIG. 1, the signal WINT8 is fed to the memory control circuit 305 and used to implement a WINT8 interrupt routine shown in FIG. 25.

Referring to FIGS. 9–11, the write address generator 330 will be described. As shown in FIG. 9, the write address generator 330 has down-counters 331 and 332, an AND gate 333, a flip-flop (F/F) 334, and a counter 335. The down-counters 331–332 each has a preset input. A signal SHIFT0–13 is preset on the preset input of the down-counter 331 and representative of the left edge of the document as counted from the beginning of the signal LGATE, as shown in FIG. 11. Likewise, a signal DOT0–13 is preset on the preset input of the down-counter 332 and representative of the actual width of the document. Specifically, the left edge SHIFT0–13 and the width DOT0–13 of a document depends on the size. In light of this, the memory control circuit 305 determines the values SHIFT0–13 and DOT0–13 on the basis of the signal DATAWIDTH detected by the width detector 310 (usually DATAWIDTH=DOT0–13), and sets them on the down-counters 331 and 332 (as will be described with reference to FIG. 24 later).

Also applied to the down-counter 331 are the previously mentioned *LGATEST, or load signal LD, indicative of the beginning of the signal LGATE, and the clock signal CLK. When the signal *LGATEST goes low, the preset value SHIFT is loaded. Subsequently, the down-counter 331 counts down in synchronism with the clock signal CLK. When the down-counter 331 fully counts down the preset value SHIFT, a borrow occurs with the result that the output *SHIFTEND of the down-counter 331 goes low. However, the output *SHIFTEND is applied to the clock terminal CLK of the F/F 334 via the AND gate 333, and the F/F 334 has been preset by the inverted signal *LSYNC of the signal LSYNC, i.e., the input D thereof (=output *Q) is in a low level. Hence, the output Q *ADRSENB of the F/F 334 goes low at the positive-going edge of the output *SHIFTEND of the down-counter 331.

The output *SHIFTEND of the down-counter 331 is fed to the down-counter 332 as a load signal LD. This, coupled with the fact that the clocks signal CLK is also applied to the down-counter 332, loads the preset value DOT and then causes the down-counter 332 to count down in synchronism with the clock signal CLK. When the down-counter 332 fully counts down the preset value DOT, a borrow occurs with the result that the output *DOTEND thereof goes low. However, the output Q *ADRSENB of the F/F 334 goes high since the signal *DOTEND is applied to the clock terminal CLK of the F/F 334 via the AND gate 333.

The counter 335 is operated as follows. The counter 335 receives at a preset input thereof the initial value of the write address WADINIT0–23 from the memory control circuit 305 via the write address setter 340. The initial value WADINIT0–23 is loaded by a load signal WINT83ST which goes low for the duration of one clock from the beginning of the output WINT8 of the write line counter 350. As a result, write address WADRS0–23 meant for the memory 302 is provided with the initial value WADINIT0–23. The output Q *ADRSENB of the F/F 334 is applied to the count enable terminal EP of the counter 335. Therefore, the counter 335 does not count up when *ADRSENB is in a high level, maintaining the write address WADRS0–23 unchanged. However, when the output Q *ADRSENB goes low, the counter 335 counts up to update the write address WADRS0–23. Consequently, one line of image data extending over the width DOT is written to the memory 302. The output Q *ADRSENB is also applied to the read address generator 390, as will be described with reference to FIGS. 17 and 18 later.

As shown in FIG. 12, the write address setter 340 is comprised of a parallel I/O (Input/Output) 341. The memory control circuit 305 calculates, based on the signal DATAWIDTH detected by the width detector 310 and the output WINT8 detected by the write line counter 350, the initial value WADSET0–23 of the write address and feeds them to the input IN of the parallel I/O 341. The parallel I/O 341 holds the input value WADSET0–23 as the initial value WADINIT0–23 until the next initial value WADSET0–23 arrives from the memory control circuit 305.

A reference will be made to FIGS. 13–19 for describing the read control circuit 304 in detail. As shown in FIG. 13, the read valid signal generator 360 is implemented by an F/F 361. A signal RFGENB is applied to the clear terminal CLR of the F/F 361 and is held in a low level until the memory control circuit 305 determines that data can be read out of the memory 302. Hence, during such a period of time, the output Q, i.e., read valid signal RFGATE of the F/F 361 remains in a low level. As shown in FIG. 14, assume that the memory control circuit 305 turns the signal RFGENB to a high level, determining that data can be read out of the memory 302, as shown in FIG. 14. Then, the read valid signal RFGATE is ready to be output. In this condition, on receiving a data request signal DREQ from the printer 200, the read valid signal RFGATE goes high at the positive-going edge of the signal DREQ since the input D is in a high level. After image data have been read out of the memory 302, the memory control circuit 305 causes the signal RFGENB to go low. As a result, the read valid signal RFGATE goes low, i.e., disappears. As shown in FIG. 1, the read valid signal RFGATE is applied to the read line counter 370 and memory control circuit 305, FIG. 1, and used to implement control which will be described.

As shown in FIG. 15, the read line counter 370 is made up of a counter 371 and an AND gate 372. The counter 371 receives the read valid signal RFGATE from the read valid signal generator 360 at a clear terminal CLR and receives the synchronizing signal LSYNC at a clock terminal CLK. The output $Q_A$–$Q_C$ of the counter 371 is fed to the AND gate 372. Assume that the memory control circuit 305 has determined that data can be read out of the memory 302 and has turned the signal RFGENB to a high level, and that a data request signal DREQ from the printer 200 has arrived to cause the read valid signal RFGATE to go high. Then, the output $Q_A$–$Q_C$ of the counter 371, having been cleared, is set. Therefore, the counter 371 counts up every time the positive-going edge of the signal LSYNC arrives at the clock terminal CLK, i.e., every time one line of the document is scanned. On reaching a count "7" ($Q_A$–$Q_C$ in a high level), the output RINT8 of the AND gate 322 goes high.

Subsequently, the count of the counter 371 returns to "0". As a result, every time the read valid signal RFGATE goes high and eight lines of the document are read out, the output RINT8 of the AND gate 372 goes high over the interval of a single signal LSYNC. As shown in FIG. 1, the signal RINT8 is applied to the memory controller 305 and used to execute an RINT8 interrupt procedure shown in FIG. 27.

As shown in FIG. 17, the read address generator 390 is comprised of a counter 391. The operation of the counter 391 will be described with reference to FIG. 18. The initial value RADINIT0–23 of the read address to be generated in the memory 302 is set on the preset input of the counter 391 beforehand. This is done by a signal *RINT8SST which goes low for a single clock from the beginning of the output RINT8 of the read line counter 370. Therefore, the initial value RADINIT0–23 is set as the read address RADRS0–23. Further, the output *ADRSENB of the write address setter 330 is fed to the count enable terminal EP of the counter 391. Hence, even when a clock signal CLK arrives at the counter 391, the counter 391 does not count it up while the signal *ADRSENB is in a high level, thereby maintaining the initial read address value RADINIT 0–23. However, when the signal *ADRSENB goes low, the counter 391 counts up and updates the read address RADR0–23. Consequently, one line of image data extending over the document width DOT is read out of the memory 302.

As shown in FIG. 19, the read address setter 380 comprises a parallel I/O 381. The memory control circuit 305 calculates, based on the signal DATAWIDTH detected by the document width detector 310 and the output RINT8 detected by the read line counter 370, the initial value RADSET0–23 of the read address and delivers it to the input IN of the parallel I/O 381. The parallel I/O 381 holds the input value RADSET0–23 as the initial value RADINIT0–23 until the next initial value RADSET0–23 of the read address arrive from the memory control circuit 305.

Referring to FIGS. 20–29, the operation of the memory control circuit, or main controller as referred to hereinafter, 305 will be described. The main controller 305 has a CPU (Central Processing Unit) and a ROM (Read Only Memory), RAM (Random Access Memory), interrupt controller and other peripheral units. The CPU executes a main control routine shown in FIG. 20 according to a program which is stored in the ROM. To begin with, on the turn-on of a power source, the CPU initializes variables to be used by the interrupt controller, parallel I/O and program as well as a counter Yin indicative of how many times the WINT8 interrupt processing has been executed (step S1). In the next step S2, the CPU waits until a document has been inserted into the scanner 100 and a copying operation begins. After a document has been inserted (Y, step S2), the document width detector 310 detects a width signal DATAWIDTH (step S3). In response, the CPU calculates a signal SHIFT indicative of the left edge of the document (step S4), sets it in the write address generator 330 (step S5), and sets the initial write address value WADSET0–23 (=OFFSET) in the write address setter 340 (step S6).

After the step S6, the CPU turns the signal RFGENB, indicating that data can be read out, to a high level and sets it in the read valid signal generator 360 (step S7). As a result, a data request signal DREQ from the printer 200 is validated. Subsequently, the CPU determines whether or not a memory change flag, indicative of whether or not to calculate the occupancy of the memory 302, is set is determined (step S8). If the answer of the step S8 is positive, Y, the CPU calculates the occupancy of the memory 302 by a method which will be described later (step S9), sends the calculated occupancy to a display (system controller 500 and operation panel 450, FIG. 2), and then returns to the step S2.

Figure 28:
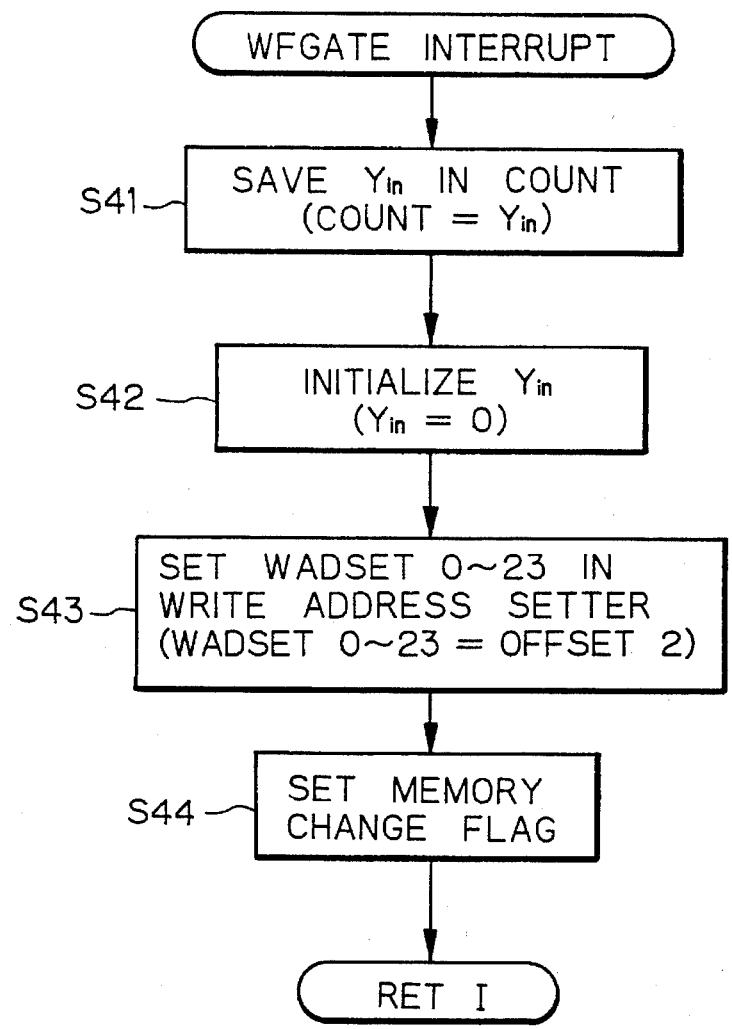
FIG. 28 is a flowchart representative of a WAGATE interrupt routine to be executed by the memory control circuit.

The memory change flag mentioned above is set when a WFGATE interrupt routine shown in FIG. 28 is to be executed (when data have been fully written to the memory 302) and when, as stated earlier, a paper carrying an image thereon has been driven out of the copier (when data have been fully read out of the memory 302). Why the memory change flag is not set in the event of an RFGATE interrupt routine shown in FIG. 29 (at the end of actual read-out) is that when the discharge of the paper from the printer 200 fails due to a jam or similar cause, it is necessary to read data out of the memory 302 again.

Further, even when the occupancy of the memory 302 has changed at the end of the discharge of the paper, the capacity available with the memory 302 constantly changes if another document is being written at that time. In light of this, the memory change flag is not set until the document being written has been fully written; it is set in the event of the WFGATE interrupt procedure.

Figure 21:
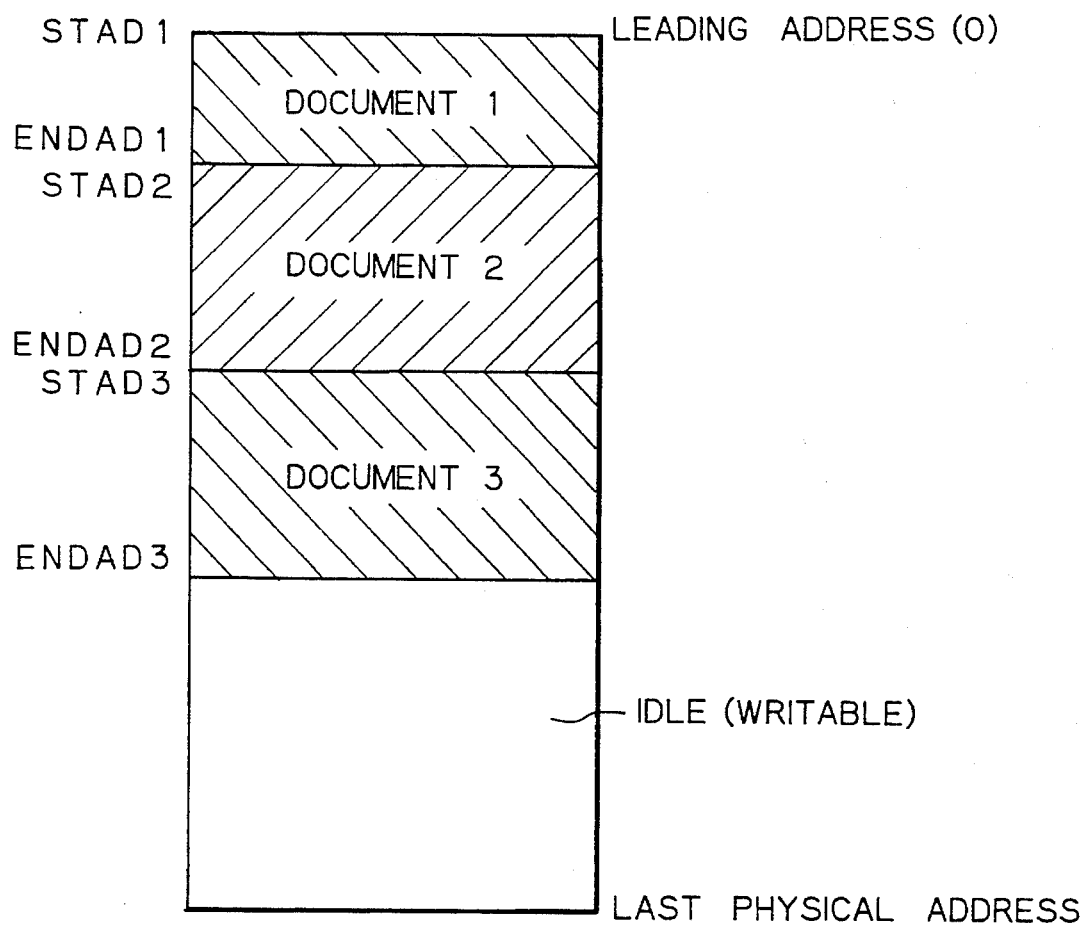
FIG. 21 shows a plurality of document images stored in the memory in the form of image data.
Figure 22:
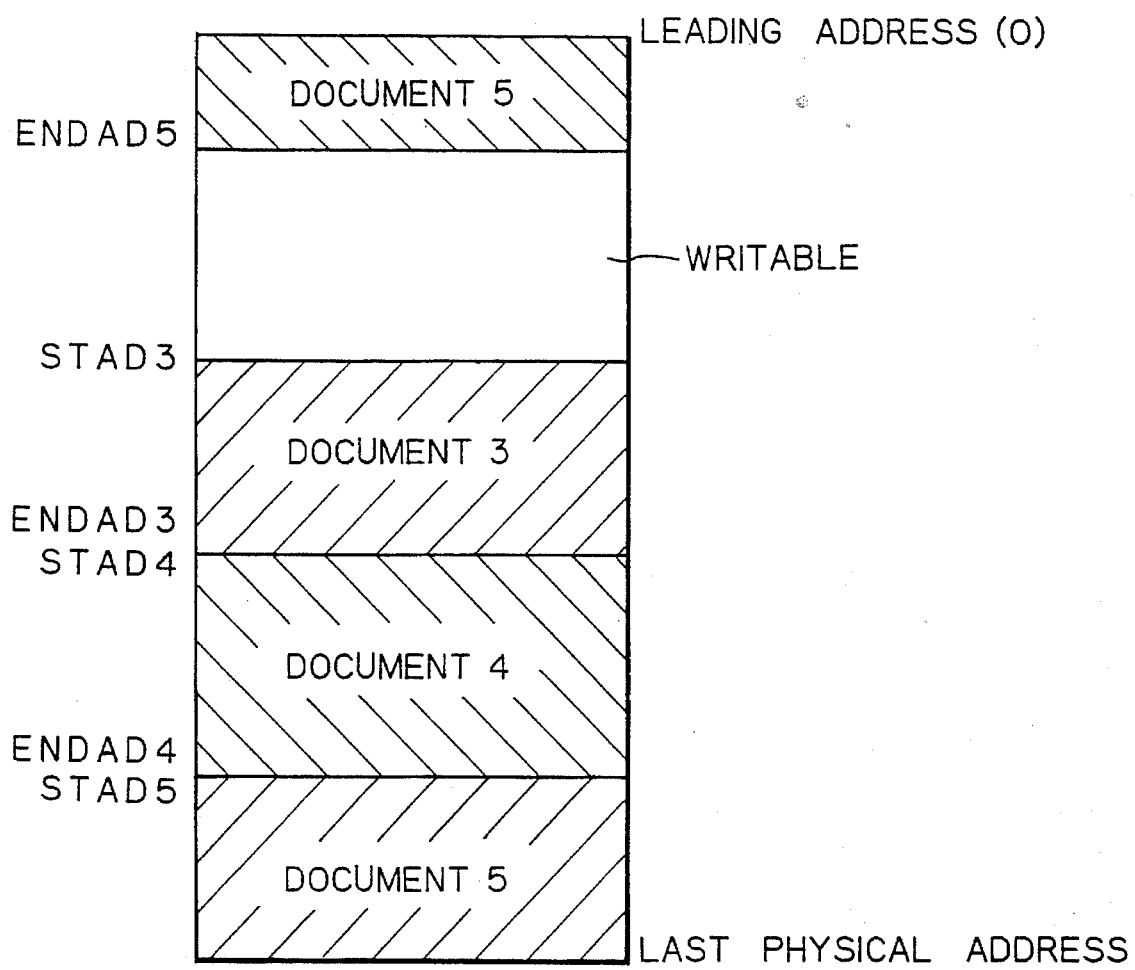
FIG. 22 shows the memory in a specific condition wherein a write end address has exceeded the last physical address of the memory.

Referring to FIGS. 21–24, specific procedures for calculating the occupancy of the memory 302, i.e., the occupied area and unoccupied area of the memory 302, as well as specific displays thereof. FIG. 21 shows image data representative of three documents 1–3 written in the memory 302 and an unoccupied area (available for other documents). As shown, a document 1 is provided with a write start address STAD1 and a write end address ENDAD1. Likewise, a document 2 is provided with a write start address STAD2 and a write end address ENDAD2. Further, a document 3 is provided with a write start address STAD3 and a write end address ENDAD3. At this instant, a difference, or OFFSET included in the WINT8 interrupt routine of FIG. 25, exists between the end address ENDAD of the preceding document and the start address of the following document. Assume an ordinary writing condition wherein the write end address ENDAD does not reach the last physical address of the memory 302. Then, since the address is sequentially counted up from the write start address STAD to the write end address ENDAD, the write end address is greater than the write start address. Therefore, the area of the memory 302 occupied by a given document is expressed as:

occupied area=write end address−write start address     Eq. (1)

On the other hand, assume that the number of documents is excessively great or that the document size is greater than the idle area available in the memory 302. Then, as shown in FIG. 2, the address counted up may reach the last physical address of the memory 302 and then return to the first address for continuously writing data in the memory 302. In such a case, the write end address ENDAD physically precedes the write start address STAD, i.e., the former is smaller than the latter. Hence, the area of the memory 302 occupied by a given document is produced by:

occupied area  =  last physical address −     Eq. (2)
              write start address +
              write end address − first address (= 0)
      =  write end address −
              write start address +
              last physical address This, of course, occurs when the preceding document (not necessarily the immediately preceding document) has been fully read out. Whether or not the preceding document has been fully read out may be determined on the basis of another flag, e.g., busy flag or by comparing the write address and the minimum writable address. The minimum writable address is unwritable since read-out has not ended at such an address and successive addresses.

Further, assume that a plurality of document data are stored in the memory 302. Then, the areas of the memory 302 occupied by the respective documents are calculated by use of either the Eq. (1) or the Eq. (2). Subsequently, the resulting areas are summed up to produce the total occupied area of the memory 302, as follows:

total occupied area=Σ areas occupied by respective documents

Finally, the unoccupied area of the memory 302 is produced by:

unoccupied area=total memory capacity−total occupied area

Figure 23:
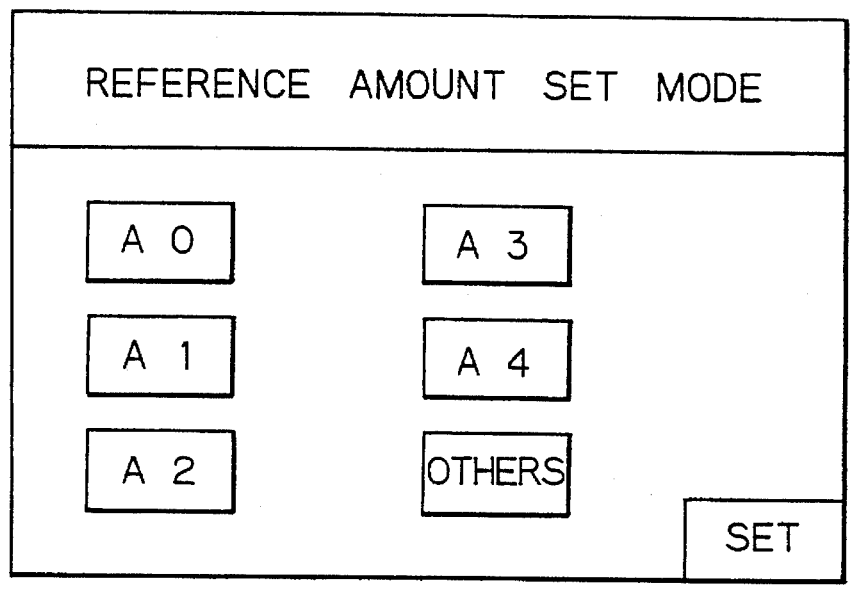
FIG. 23 shows a screen accessible for entering a reference amount associated with the occupancy of the memory.

As shown in FIG. 23, the embodiment allows the user to enter one or more reference amounts, which are easy for the user to grasp, on the operation and display panel 450. The reference amount corresponds to, for example, a single paper of A4 size. In response, the unoccupied area calculated by the above procedure is divided by a preselected reference amount, as follows:

unoccupied area (papers)  =  unoccupied area
                           (addresses) /
                           reference amount
                           (addresses/paper)

Figure 24:
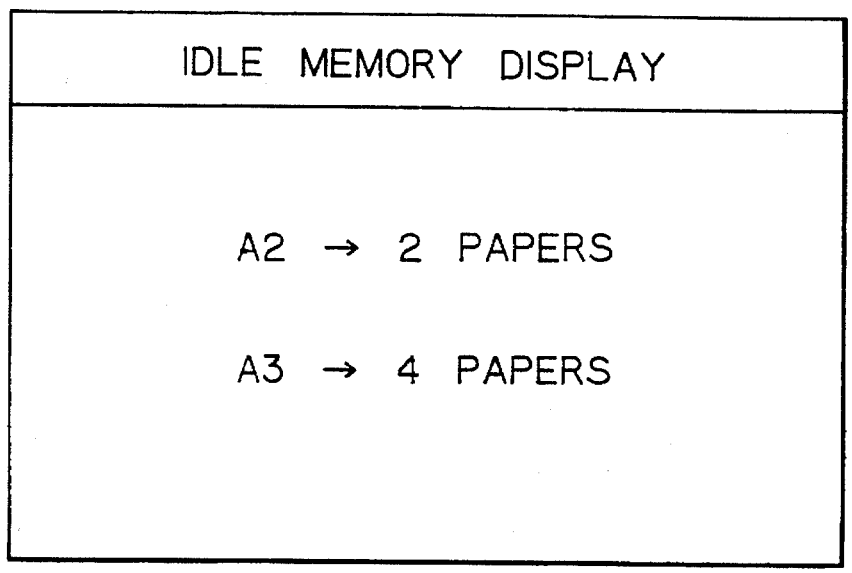
FIG. 24 shows a display showing the occupancy of the memory for each of a plurality of reference amounts.

As a result, the unoccupied area (number of papers) is indicated on the operation and display panel 450 on a preselected reference amount basis, as shown in FIG. 24. This informs the user of the occupancy of the memory 302 (unoccupied area in the embodiment) and, therefore, allows the user to easily grasp the sizes and numbers of documents which can be set under the existing conditions.

Figure 25:
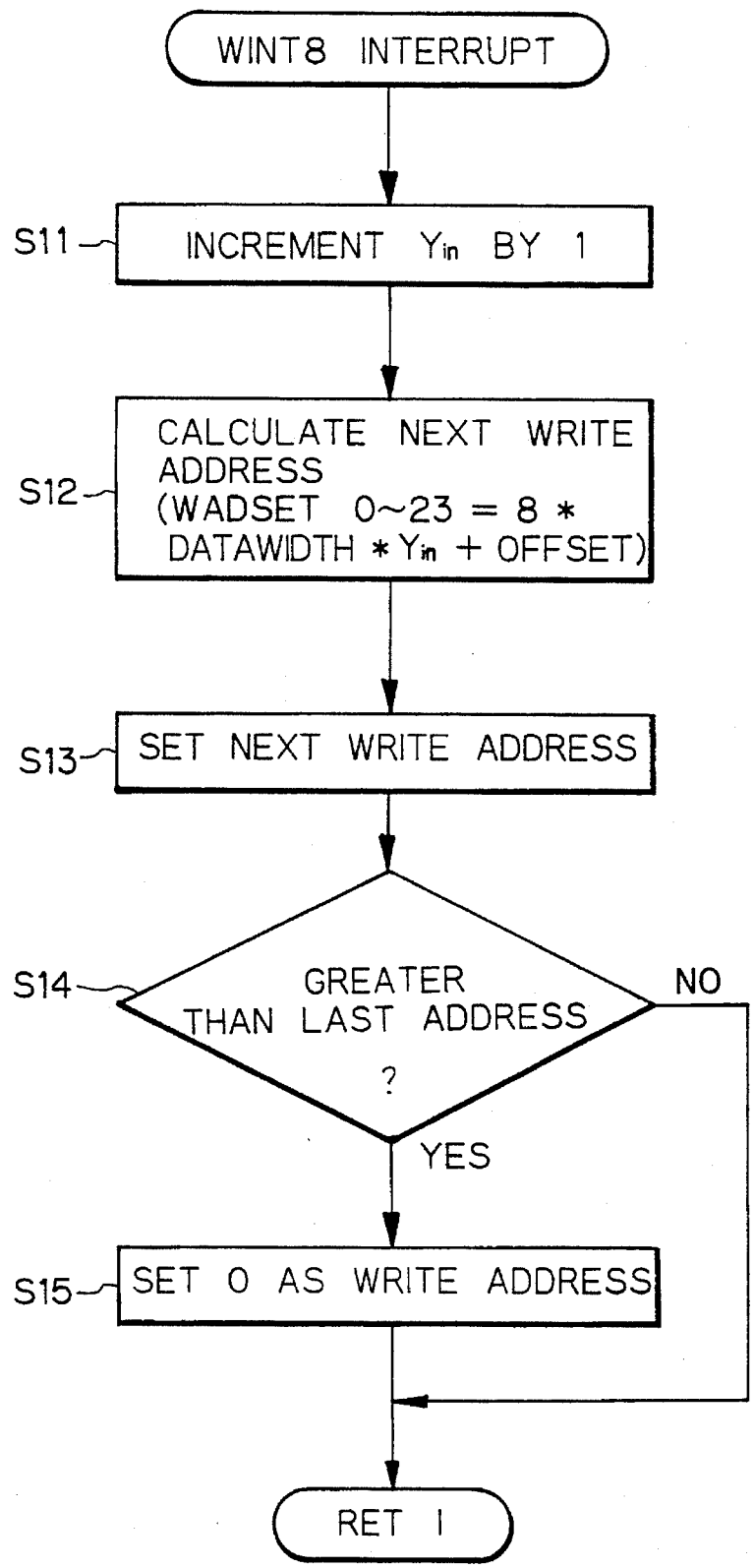
FIG. 25 is a flowchart representative of a WINT8 interrupt routine to be executed by the memory control circuit.

The WINT8 interrupt routine shown in FIG. 25 will be described. After a document has been inserted into the scanner 100, the width DATAWIDTH of the document is detected, as stated with reference to FIG. 7. Subsequently, after the scanner 100 has started scanning the document, the read valid range signal WFGATE goes high. Then, after the document has been scanned over eight consecutive lines, the output WINT8 of the write line counter 350 goes high. The WINT8 interrupt routine begins in response to the positive-going edge of the signal WINT8.

To begin with, the counter Yin indicative of how many times the WINT8 interrupt routine has been executed is incremented by 1 (one) (step S11). It is to be noted that the initial counter value Yin is "1" since the counter Yin has been initialized in the step S1 of FIG. 20. Subsequently, the address of the memory 302 for writing the next eight lines of data is calculated by the following equation (step S12):

WADSET0–23=8 * DATAWIDTH * Yin+OFFSET

Specifically, since an interruption occurs every eight lines, one line of data DATAWIDTH8 is multiplied by 8, the resulting product is further multiplied by the number of times of interruption Yin, and the initially set write address OFFSET is added to the resulting product. The result of calculation WADSET0–23 is set in the address setter 340 (step S13). Then, whether or not the write address WADSET0–23 is the last physical address of the memory 320 is determined (step S14). If the answer of the step S14 is Yes, the address WADSET0–23 is set at the leading address (=0) of the memory 320 (step S15), and then the interrupt procedure ends. If the answer of the step S14 is No, the procedure simply ends, skipping the step S15. Every time the WINT8 interrupt procedure occurs, the leading value of the write address for the next eight lines is calculated and then set in the address setter 340. As a result, image data are written to the memory 302 with the write address of the memory 302 being sequentially controlled.

Figure 26:
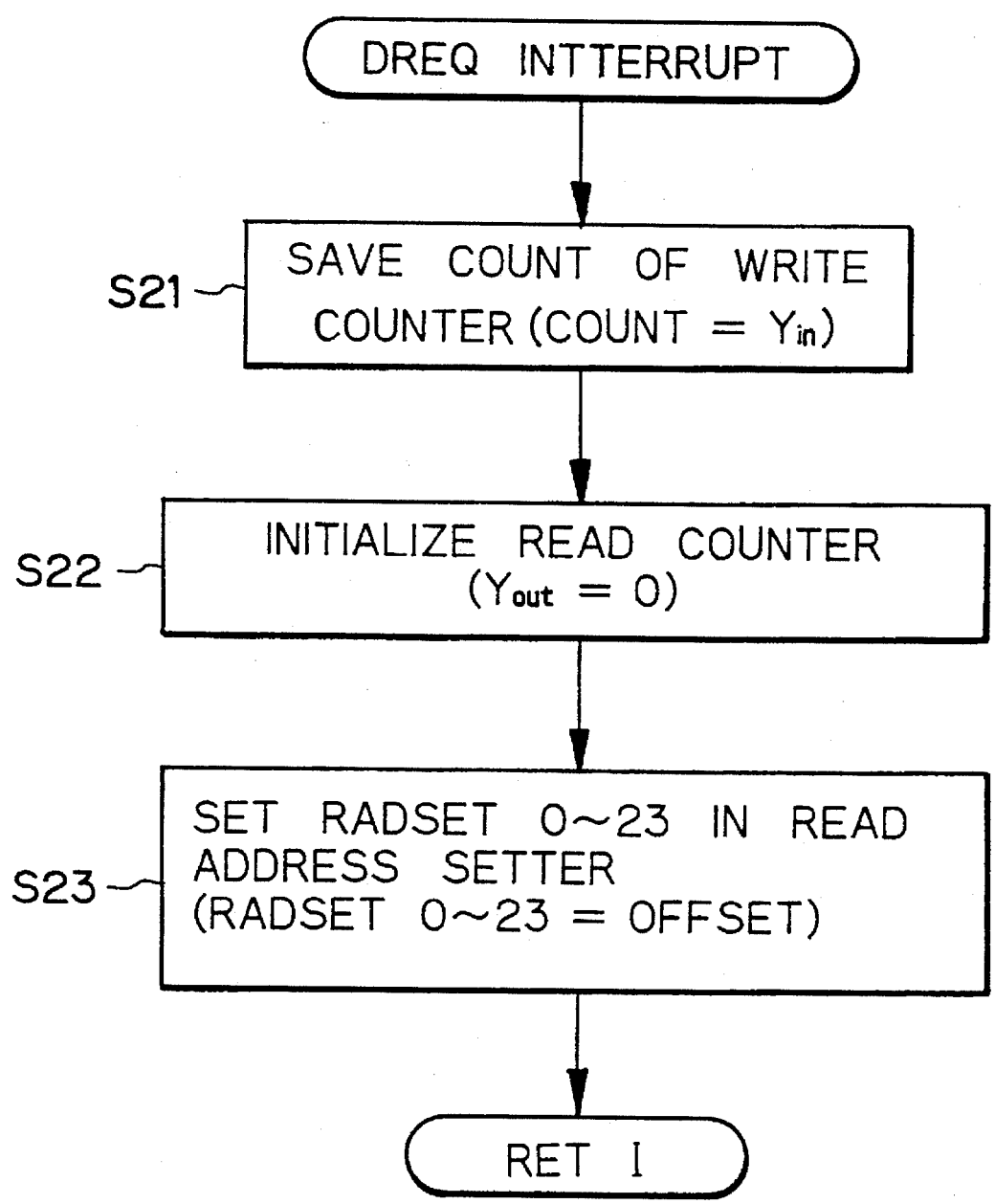
FIG. 26 is a flowchart representative of a DREQ interrupt routine to be executed by the memory control circuit.

A reference will be made to FIG. 26 for describing the DREQ interrupt procedure. As the document has been read to a certain extent and image data are written to the memory 302, a paper is fed in the printer 200. When the paper approaches a predetermined position where development begins, the printer 200 sends the previously mentioned data request signal DREQ at a predetermined timing. The DREQ interrupt procedure begins in response to the data request signal DREQ. First, the value of the write counter Yin indicative of the number of times of WINT8 interrupt procedure occurred up to that time is saved in a counter COUNT (step S21). Subsequently, a read counter Yout, which is to be used by the program in the event of read-out, is initialized (Yout=0) (step S22). Then, RADSET0–23 (=OFFSET=head of write address) is read out as the head of the read address of the memory 302 and set in the read address setter 380 (step S23). This is the end of the procedure.

The RINT8 interrupt routine shown in FIG. 27 will be described. In response to the data request signal DREQ from the printer 200, the read valid signal generator 360 generates a read valid signal RFGATE. Then, every time eight lines of image data are read out of the memory 302, the line counter 370 generates a signal RINT8 which triggers the procedure shown in FIG. 27.

Figure 27:
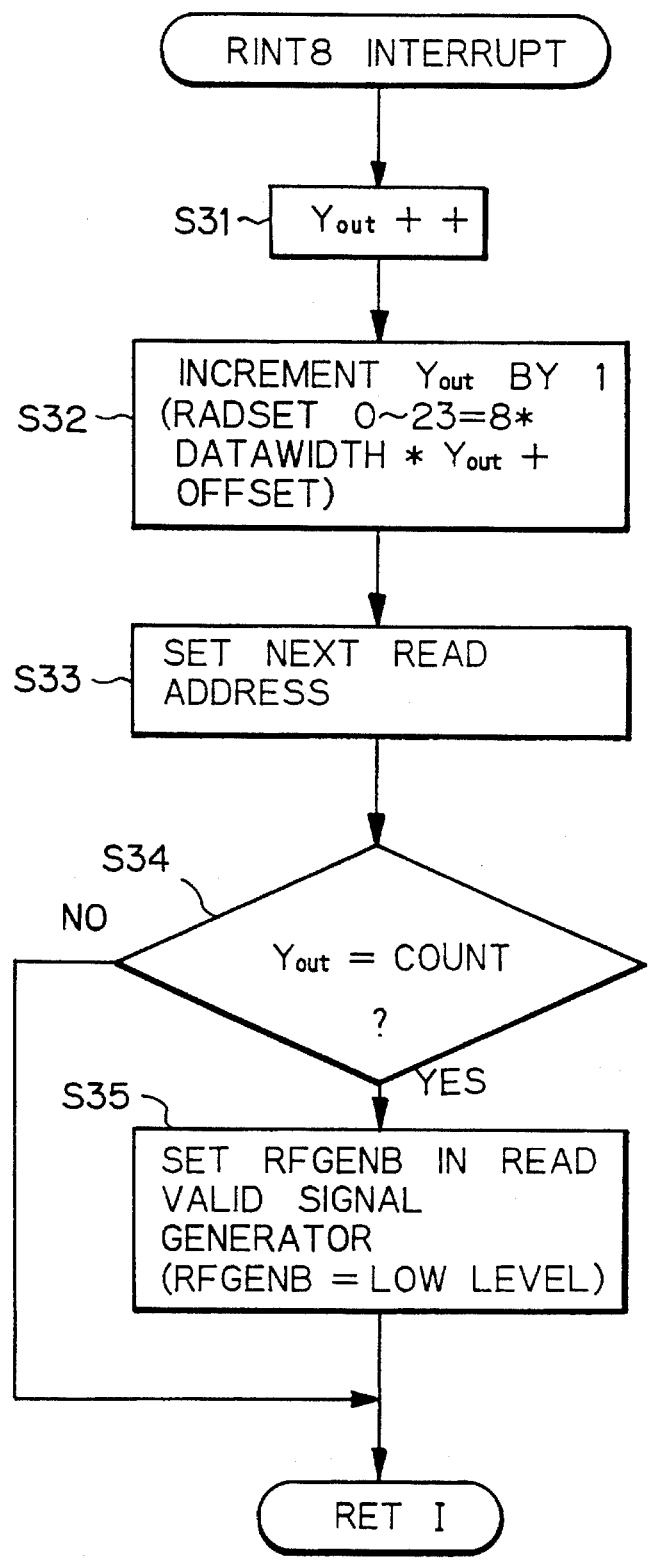
FIG. 27 is a flowchart representative of an RINT8 interrupt routine to be executed by the memory control circuit.

As shown in FIG. 27, the read counter Yout is incremented by 1 (step S31). The first Yout is "1" since the counter Yout has been initialized in the step S22 of FIG. 26. Subsequently, the read address of the memory 302 for reading out the next eight lines of data is calculated, as follows (step S32):

RADSET0–23=8 * DATAWIDTH * Yout+OFFSET

Again, since an interruption occurs every eight lines, one line of data DATAWIDTH8 is multiplied by 8, the resulting product is further multiplied by the number of times of interruption Yout, and the initially set write address OFFSET is added to the resulting product. The result of calculation RADSET0–23 is set in the read address setter 380 (step S33). Then, the read counter Yout and the value saved in the counter COUNT are compared (step S34). At the early stage of document reading, the read counter Yout remains smaller than the value saved in the counter COUNT. Hence, it is determined that not all of the image data stored in the memory 302 have been read out. However, after the document have been fully read out, the read counter Yout becomes equal to the count COUNT after a while, meaning that all the image data have been read out of the memory 302. Then, the signal RFGENB meant for the read valid signal generator 360 is caused to go low (step S35), ending the procedure. Every time the WINT8 interrupt procedure occurs, the head of the read address for the next eight lines is calculated and then set in the read address setter 380. As a result, image data are read out of the memory 302 with the read address of the memory 302 being sequentially controlled.

The WFGATE interrupt routine shown in FIG. 28 is as follows. After the document has been fully read, the document length detector 320 causes the read valid range signal WFGATE associated with the subscanning direction to go low. This triggers the procedure shown in FIG. 28. To begin with, the value of the write counter Yin indicative of the number of times of WINT8 interrupt procedure occurred up to that time is saved in the counter COUNT and used as a condition on which the RINT8 interrupt routine of FIG. 27 ends (step S41). Subsequently, the write counter Yin is initialized so as to prepare for the next document (step S42). The initial value OFFSET2 (=WADSET0–24) of the address for writing the image data of the next document in the memory 302 is set in the address setter 340 (step S43). The occupancy of the memory 302 has changed at the end of the write-in of image data. Hence, the memory change flag is set (step S44). This is the end of the WFGATE interrupt routine.

Figure 29:
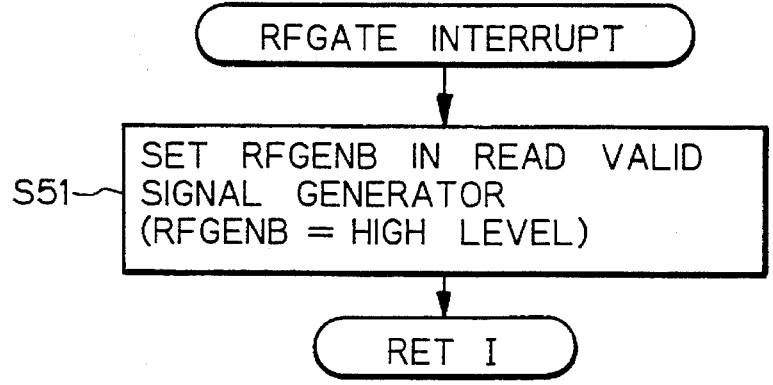
FIG. 29 is a flowchart representative of an RFGATE interrupt routine to be executed by the memory control circuit.

The RFGATE interrupt routine shown in FIG. 29 will be described. After the image data have been read out of the memory 302, the signal RFGENB meant for the read valid signal generator 360 goes low in the RINT8 interrupt procedure, as stated earlier. The RFGATE interrupt routine begins in response to the inverted signal of the signal RFGENB. As shown, in a step S51, the signal RFGEMB meant for the read valid signal generator 360 is caused to go high. As a result, a repeat copy mode or a data request signal DREQ from the printer 200 to appear after the next document has been read is validated. Then, the program ends.

In summary, it will be seen that the present invention provides a digital copier having various unprecedented advantages, as enumerated below.

(1) Since the occupancy of storing means is calculated on the basis of write addresses thereof and displayed, the user can cause the copier to read a document while confirming the occupancy of the storing means. This prevents image data stored in the storing means from being destroyed and, therefore, makes it needless to read a document again.

(2) Since the copier calculates and displays the occupancy of the storing means every time a document is read, the occupancy can be calculated and displayed rapidly and accurately.

(3) The occupancy is calculated and displayed after a paper carrying an image thereon has been driven out of the copier. Hence, when the image is read out again due to, for example, a jam, the occupancy of the storing means can be calculated and displayed accurately.

(4) Even after the paper has been driven out of the copier, the occupancy of the storing means is not calculated if the next document is being read. It follows that the occupancy can be calculated and displayed accurately even when it changes every moment.

(5) The occupancy of the storing means is calculated and displayed on the basis of a difference between the write end address and the write start address. Therefore, when the write end address is short of the last physical address of the storing means, the occupancy can be calculated and displayed accurately.

(6) When the write start address is greater than the write end address, the last physical address of the storing means is added to a difference between the write end address and the write start address, thereby calculating and displaying the occupancy. This insures the accurate calculation of the occupancy even in such a condition.

(7) After image data have been written to the storing means, the occupancy of the storing means is calculated and displayed for all the documents which have not been copied. It follows that when the storing means is capable of storing a plurality of document images, the occupancy can be calculated and displayed with accuracy.

(8) The occupancy of the storing means is calculated and displayed on the basis of a preselected reference and, therefore, in matching relation to the size of documents to be copied. This prevents image data stored in the storing means from being destroyed and, therefore, makes it needless to read a document again.

(9) The occupancy of the storing means can be calculated and displayed on the basis of each of a plurality of predetermined reference amounts. Only if the user inserts a document after selecting a desired document size, image data stored in the storing means are prevented from being destroyed, and it is not necessary to read a document again.

Various modifications will become possible for those skilled in the art after receiving the teachings of the present disclosure without departing from the scope thereof.

What is claimed is:

1. A digital copier comprising:

reading means for reading an image of a document digitally;

storing means for storing image data read by said reading means;

write control means for writing the image data read by said reading means in said storing means;

read control means for reading the image data out of said storing means; and image forming means for forming a document image on a recording medium on the basis of the image read out of said storing means by said read control means;

said write control means comprising:

document length detecting means for detecting a length, in a subscanning direction, of the document read by said reading means;

line counting means for counting write lines of said storing means over the length of the document detected by said document length detecting means;

address setting means for setting a write address for said storing means on the basis of a count output from said line counting means; and calculating means for calculating an occupancy of said storing means on the basis of the write address set by said address setting means, wherein said calculating means calculates the occupancy of said storing means when said read control means has fully read out the image data on a document basis.

2. A digital copier comprising:

reading means for reading an image of a document digitally;

storing means for storing image data read by said reading means;

write control means for writing the image data read by said reading means in said storing means;

read control means for reading the image data out of said storing means;

image forming means for forming a document image on a recording medium on the basis of the image data read out of said storing means by said read control means; and display means for displaying an occupancy of said storing means;

said write control means comprising:

document length detecting means for detecting a length, in a subscanning direction, of the document read by said reading means;

line counting means for counting write lines of said storing means over the length of the document detected by said document length detecting means;

address setting means for setting a write address for said storing means on the basis of a count output from said line counting means; and calculating means for calculating the occupancy of said storing means on the basis of the write address set by said address setting means;

said calculating means calculating the occupancy of said storing means when the recording medium carrying the document image formed by said image forming means is driven out of said copier.

3. A copier as claimed in claim 1, further comprising display means for displaying the occupancy of said storing means calculated by said calculating means.

4. A copier as claimed in claim 2, wherein if said reading means is reading a next document, said calculating means does not calculate the occupancy of said storing means even after the recording medium has been driven out of said copier.

5. A copier as claimed in claim 2, wherein said calculating means calculate the occupancy of said storing means on the basis of a difference between a write end address and a write start address of said storing means.

6. A copier as claimed in claim 1, wherein when a write start address of said storing means is greater than a write end address, said calculating means calculates the occupancy of said storing means by adding a last physical address of said storing means to a difference between said write end address and said write start address.

7. A copier as claimed in claim 1, wherein after the image data have been written to said storing means, said calculating means calculates the occupancy of said storing means for all the documents which have not been copied by said image forming means.

8. A copier as claimed in claim 3, wherein said calculating means comprises reference amount setting means for setting a reference amount for the occupancy of said storing means beforehand, said calculating means calculating said occupancy on the basis of said reference amount and displaying said occupancy on said display means.

9. A copier as claimed in claim 8, wherein said reference amount setting means is capable of setting a plurality of reference amounts, said calculating means calculating the occupancy of said storing means with each of said plurality of reference amounts and displaying said occupancy on said display means.

10. A copier as claimed in claim 2, wherein when a write start address of said storing means is greater than a write end address, said calculating means calculates the occupancy of said storing means by adding a last physical address of said storing means to a difference between said write end address and said write start address.

11. A copier as claimed in claim 2, wherein after the image data have been written to said storing means, said calculating means calculates the occupancy of said storing means for all the documents which have not been copied by said image forming means.

12. A copier as claimed in claim 2, wherein said calculating means comprises reference amount setting means for setting a reference amount for the occupancy of said storing means beforehand, said calculating means calculating said occupancy on the basis of said reference amount and displaying said occupancy on said display means.

13. A copier as claimed in claim 12, wherein said reference amount setting means is capable of setting a plurality of reference amounts, said calculating means calculating the occupancy of said storing means with each of said plurality of reference amounts and displaying said occupancy on said display means.

\* \* \* \* \*